US012387088B2

(12) United States Patent
Harvey et al.

(10) Patent No.: US 12,387,088 B2
(45) Date of Patent: Aug. 12, 2025

(54) METHOD AND SYSTEM FOR GENERATING ONE OR MORE CONDITIONALLY DEPENDENT DATA ENTRIES

(71) Applicant: The University of British Columbia, Vancouver (CA)

(72) Inventors: William Harvey, Vancouver (CA); Saeid Naderiparizi, Vancouver (CA); Vaden Masrani, Vancouver (CA); Christian Dietrich Weilbach, Vancouver (CA); Frank Wood, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 18/199,865

(22) Filed: May 19, 2023

(65) Prior Publication Data

US 2024/0386249 A1 Nov. 21, 2024

(51) Int. Cl.
*G06N 3/047* (2023.01)
*G06N 7/01* (2023.01)

(52) U.S. Cl.
CPC .............. *G06N 3/047* (2023.01); *G06N 7/01* (2023.01)

(58) Field of Classification Search
CPC ................................ G06N 3/047; G06N 7/01
See application file for complete search history.

(56) References Cited

PUBLICATIONS

Yang, Ruihan, Prakhar Srivastava, and Stephan Mandt. "Diffusion probabilistic modeling for video generation." arXiv preprint arXiv:2203.09481 (2022). (Year: 2022).*
Kumar, Manoj, et al. "Videoflow: A flow-based generative model for video." arXiv preprint arXiv:1903.01434 2.5 (2019): 3. (Year: 2019).*
Kumar, Manoj, et al. "Videoflow: A flow-based generative model for video." arXiv preprint arXiv:1903.01434 2.5 (2019): (Year: 2019).*
Filipowicz, Wlodzimierz. "Conditional dependencies in imprecise data handling." Procedia Computer Science 192 (2021): 80-89. (Year: 2021).*
Sruthi, Panchapakesan C., Sanjay Rao, and Bruno Ribeiro. "Pitfalls of data-driven networking: A case study of latent causal confounders in video streaming." Proceedings of the Workshop on Network Meets AI & ML. 2020. (Year: 2020).*
D. Nguyen-tuong et al. "Learning Inverse Dynamics: A Comparison". Conference: ESANN 2008, 16th European Symposium on Artificial Neural Networks, Bruges, Belgium, Apr. 23-25, 2008.

(Continued)

*Primary Examiner* — Kevin W Figueroa

(57) ABSTRACT

Methods, systems, and techniques for generating one or more conditionally dependent data entries using a probabilistic generative model, and for training that model. The probabilistic generative model is trained using a plurality of data generation tasks respectively corresponding to a plurality of vectors each having a sequence of differently indexed data entries that are conditionally dependent on each other. Each of the data generation tasks involves generating at least one latent data entry selected from the sequence of data entries in response to being provided at least one index for each of the at least one latent data entry. Training can be performed by minimizing an expected value of a denoising loss over all training stages.

34 Claims, 19 Drawing Sheets

(56) References Cited

PUBLICATIONS

T. Osa et al. "An algorithmic perspective on imitation learning". Foundations and Trends® in Robotics 7.1-2 (2018), pp. 1-179.

A. Radford et al. "Learning transferable visual models from natural language supervision". International Conference on Machine Learning. PMLR. 2021, pp. 8748-8763.

J. Rawlings, E. Meadows, and K. Muske. "Nonlinear Model Predictive Control: A Tutorial and Survey". IFAC Proceedings vols. 27.2 (1994), pp. 185-197. ISSN: 1474-6670. DOI: 10.1016/S1474-6670(17)48151-1.

G. Rong et al. "LGSVL Simulator: A High Fidelity Simulator for Autonomous Driving". arXiv preprint arXiv:2005.03778 (2020).

C. Saharia et al. Photorealistic Text-to-Image Diffusion Models with Deep Language Understanding. May 2022. DOI: 10.48550/arXiv.2205.11487. arXiv: 2205.11487 [cs].

T. Salimans et al. "Pixelcnn++: Improving the pixelcnn with discretized logistic mixture likelihood and other modifications". arXiv preprint arXiv:1701.05517 (2017).

S. Shah et al. "AirSim: High-Fidelity Visual and Physical Simulation for Autonomous Vehicles". Field and Service Robotics. 2017. eprint: arXiv:1705.05065. URL: https://arxiv.org/abs/1705.05065.

X. Shi et al. "Are We Ready for Service Robots? The OpenLORIS-Scene Datasets for Lifelong SLAM". 2020 International Conference on Robotics and Automation (ICRA). 2020, pp. 3139-3145.

Y. Song and S. Ermon. "Generative modeling by estimating gradients of the data distribution". Advances in Neural Information Processing Systems 32 (2019).

F. Torabi, G. Warnell, and P. Stone. Behavioral Cloning from Observation. May 2018. DOI: 10.48550/arXiv.1805.01954. arXiv: 1805.01954 [cs].

W. Zhan et al. Interaction Dataset: An INTERnational, Adversarial and Cooperative moTION Dataset in Interactive Driving Scenarios with Semantic Maps. Sep. 2019. DOI: 10. 48550/arXiv. 1910 . 03088. arXiv: 1910.03088 [cs, eess].

Dan Bigioi, Shubhajit Basak, Hugh Jordan, Rachel McDonnell, and Peter Corcoran. Speech driven video editing via an audio-conditioned diffusion model. arXiv preprint arXiv:2301.04474, 2023.

Songwei Ge, Thomas Hayes, Harry Yang, Xi Yin, Guan Pang, David Jacobs, Jia-Bin Huang, and Devi Parikh. Long video generation with time-agnostic vqgan and time-sensitive transformer. arXiv preprint arXiv:2204.03638, 2022.

Aditya Ramesh, Prafulla Dhariwal, Alex Nichol, Casey Chu, and Mark Chen. Hierarchical text-conditional image generation with clip latents. arXiv preprint arXiv:2204.06125, 2022.

Ludan Ruan, Yiyang Ma, Huan Yang, Huiguo He, Bei Liu, Jianlong Fu, Nicholas Jing Yuan, Qin Jin, and Baining Guo. Mm-diffusion: Learning multi-modal diffusion models for joint audio and video generation. arXiv preprint arXiv:2212.09478, 2022.

Christian Weilbach, William Harvey, and Frank Wood. Graphically structured diffusion models. arXiv preprint arXiv:2210.11633, 2022.

Nuha Aldausari, Arcot Sowmya, Nadine Marcus, and Gelareh Mohammadi. Video generative adversarial networks: a review. ACM Computing Surveys (CSUR), 55(2):1-25, 2022.

Mohammad Babaeizadeh, Chelsea Finn, Dumitru Erhan, Roy H Campbell, and Sergey Levine. Stochastic variational video prediction. arXiv preprint arXiv:1710.11252, 2017.

Mohammad Babaeizadeh, Mohammad Taghi Saffar, Suraj Nair, Sergey Levine, Chelsea Finn, and Dumitru Erhan. Fitvid: Overfitting in pixel-level video prediction. arXiv preprint arXiv:2106.13195, 2021.

Rewon Child. Very deep vaes generalize autoregressive models and can outperform them on images. arXiv preprint arXiv:2011.10650, 2020.

Junyoung Chung, Kyle Kastner, Laurent Dinh, Kratarth Goel, Aaron C Courville, and Yoshua Bengio. A recurrent latent variable model for sequential data. Advances in neural information processing systems, 28, 2015.

Aidan Clark, Jeff Donahue, and Karen Simonyan. Adversarial video generation on complex datasets. arXiv preprint arXiv:1907.06571, 2019.

Emily Denton and Rob Fergus. Stochastic video generation with a learned prior. In International conference on machine learning, pp. 1174-1183. PMLR, 2018.

Prafulla Dhariwal and Alexander Nichol. Diffusion models beat gans on image synthesis. Advances in Neural Information Processing Systems, 34, 2021.

Alexey Dosovitskiy, German Ros, Felipe Codevilla, Antonio Lopez, and Vladlen Koltun. Carla: An open urban driving simulator. In Conference on robot learning, pp. 1-16. PMLR, 2017.

SM Ali Eslami, Danilo Jimenez Rezende, Frederic Besse, Fabio Viola, Ari S Morcos, Marta Garnelo, Avraham Ruderman, Andrei A Rusu, Ivo Danihelka, Karol Gregor, et al. Neural scene representation and rendering. Science, 360(6394):1204-1210, 2018.

Audrunas Gruslys, Remi Munos, Ivo Danihelka, Marc Lanctot, and Alex Graves. Memory efficient backpropagation through time. Advances in Neural Information Processing Systems, 29, 2016.

William H Guss, Brandon Houghton, Nicholay Topin, Phillip Wang, Cayden Codel, Manuela Veloso, and Ruslan Salakhutdinov. Minerl: A large-scale dataset of minecraft demonstrations. arXiv preprint arXiv:1907.13440, 2019.

Kaiming He, Xiangyu Zhang, Shaoqing Ren, and Jian Sun. Deep residual learning for image recognition. arxiv 2015. arXiv preprint arXiv:1512.03385, 2015.

Jonathan Ho, Ajay Jain, and Pieter Abbeel. Denoising diffusion probabilistic models. Advances in Neural Information Processing Systems, 33:6840-6851, 2020.

Jonathan Ho, Tim Salimans, Alexey Gritsenko, William Chan, Mohammad Norouzi, and David J Fleet. Video diffusion models. arXiv preprint arXiv:2204.03458, 2022.

Maximilian Igl, Luisa Zintgraf, Tuan Anh Le, Frank Wood, and Shimon Whiteson. Deep variational reinforcement learning for pomdps. In International Conference on Machine Learning, pp. 2117-2126. PMLR, 2018.

Zahra Kadkhodaie and Eero P Simoncelli. Solving linear inverse problems using the prior implicit in a denoiser. arXiv preprint arXiv:2007.13640, 2020.

Lukasz Kaiser, Mohammad Babaeizadeh, Piotr Milos, Blazej Osinski, Roy H Campbell, Konrad Czechowski, Dumitru Erhan, Chelsea Finn, Piotr Kozakowski, Sergey Levine, et al. Modelbased reinforcement learning for atari. arXiv preprint arXiv:1903.00374, 2019.

Taesup Kim, Sungjin Ahn, and Yoshua Bengio. Variational temporal abstraction. Advances in Neural Information Processing Systems, 32, 2019.

Gautam Mittal, Jesse Engel, Curtis Hawthorne, and Ian Simon. Symbolic music generation with diffusion models. arXiv preprint arXiv:2103.16091, 2021.

Alexander Quinn Nichol and Prafulla Dhariwal. Improved denoising diffusion probabilistic models. In International Conference on Machine Learning, pp. 8162-8171. PMLR, 2021.

Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017.

Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.

Tim Salimans and Jonathan Ho. Progressive distillation for fast sampling of diffusion models. arXiv preprint arXiv:2202.00512, 2022.

Vaibhav Saxena, Jimmy Ba, and Danijar Hafner. Clockwork variational autoencoders. Advances in Neural Information Processing Systems, 34, 2021.

Peter Shaw, Jakob Uszkoreit, and Ashish Vaswani. Self-attention with relative position representations. arXiv preprint arXiv:1803.02155, 2018.

Jascha Sohl-Dickstein, Eric Weiss, Niru Maheswaranathan, and Surya Ganguli. Deep unsupervised learning using nonequilibrium

(56) References Cited

PUBLICATIONS thermodynamics. In International Conference on Machine Learning, pp. 2256-2265. PMLR, 2015.
Jiaming Song, Chenlin Meng, and Stefano Ermon. Denoising diffusion implicit models. arXiv preprint arXiv:2010.02502, 2020.
Yang Song, Jascha Sohl-Dickstein, Diederik P Kingma, Abhishek Kumar, Stefano Ermon, and Ben Poole. Score-based generative modeling through stochastic differential equations. arXiv preprint arXiv:2011.13456, 2020.
Corentin Tallec and Yann Ollivier. Unbiasing truncated backpropagation through time. arXiv preprint arXiv:1705.08209, 2017.
Yusuke Tashiro, Jiaming Song, Yang Song, and Stefano Ermon. Csdi: Conditional score-based diffusion models for probabilistic time series imputation. Advances in Neural Information Processing Systems, 34, 2021.
Thomas Unterthiner, Sjoerd van Steenkiste, Karol Kurach, Raphael Marinier, Marcin Michalski, and Sylvain Gelly. Towards accurate generative models of video: A new metric & challenges. arXiv preprint arXiv:1812.01717, 2018.
Ashish Vaswani, Noam Shazeer, Niki Parmar, Jakob Uszkoreit, Llion Jones, Aidan N Gomez, Łukasz Kaiser, and Illia Polosukhin. Attention is all you need. Advances in neural information processing systems, 30, 2017.
Ruben Villegas, Dumitru Erhan, Honglak Lee, et al. Hierarchical long-term video prediction without supervision. In International Conference on Machine Learning, pp. 6038-6046. PMLR, 2018.
Dirk Weissenborn, Oscar Täckström, and Jakob Uszkoreit. Scaling autoregressive video models. arXiv preprint arXiv:1906.02634, 2019.
Kan Wu, Houwen Peng, Minghao Chen, Jianlong Fu, and Hongyang Chao. Rethinking and improving relative position encoding for vision transformer. In Proceedings of the IEEE/CVF International Conference on Computer Vision, pp. 10033-10041, 2021.
Zhisheng Xiao, Karsten Kreis, and Arash Vahdat. Tackling the generative learning trilemma with denoising diffusion GANs. In International Conference on Learning Representations, 2022. URL https://openreview.net/forum?id=JprM0p-q0Co.
Ruihan Yang, Prakhar Srivastava, and Stephan Mandt. Diffusion probabilistic modeling for video generation. arXiv preprint arXiv:2203.09481, 2022.
Richard Zhang, Phillip Isola, Alexei A Efros, Eli Shechtman, and Oliver Wang. The unreasonable effectiveness of deep features as a perceptual metric. In Proceedings of the IEEE conference on computer vision and pattern recognition, pp. 586-595, 2018.
B. Baker et al. Video PreTraining (VPT): Learning to Act by Watching Unlabeled Online Videos. Jun. 2022. arXiv:2206.11795 [cs].
A. Bucker et al. LaTTe: Language Trajectory TransformEr. Aug. 2022. DOI: 10.48550/arXiv.2208.02918. arXiv:2208.02918 [cs].
J. Devlin et al. "Bert: Pre-training of deep bidirectional transformers for language understanding". arXiv preprint arXiv:1810.04805 (2018).
B. B. Elallid et al. "A Comprehensive Survey on the Application of Deep and Reinforcement Learning Approaches in Autonomous Driving". Journal of King Saud University—Computer and Information Sciences (Apr. 2022). ISSN: 1319-1578. DOI: 10.1016/j.jksuci.2022.03.013.
S. Grigorescu et al. "A Survey of Deep Learning Techniques for Autonomous Driving". Journal of Field Robotics 37.3 (Apr. 2020), pp. 362-386. ISSN: 1556-4959, 1556-4967. DOI: 10.1002/rob.21918. arXiv: 1910.07738 [cs].
W. Harvey et al. Flexible Diffusion Modeling of Long Videos. May 2022. DOI: 10.48550/arXiv.2205.11495. arXiv: 2205.11495 [cs].
D. Hrovat et al. "The Development of Model Predictive Control in Automotive Industry: A Survey". 2012 IEEE International Conference on Control Applications. Oct. 2012, pp. 295-302. DOI: 10.1109/CCA.2012.6402735.
Y. Huang and Y. Chen. Autonomous Driving with Deep Learning: A Survey of State-of-Art Technologies. Jul. 2020. DOI: 10.48550/arXiv.2006.06091. arXiv: 2006.06091 [cs].
A. Hussein et al. "Imitation learning: A survey of learning methods". ACM Computing Surveys (CSUR) 50.2 (2017), pp. 1-35.
M. Janner et al. Planning with Diffusion for Flexible Behavior Synthesis. May 2022. arXiv: 2205.09991 [cs].

* cited by examiner

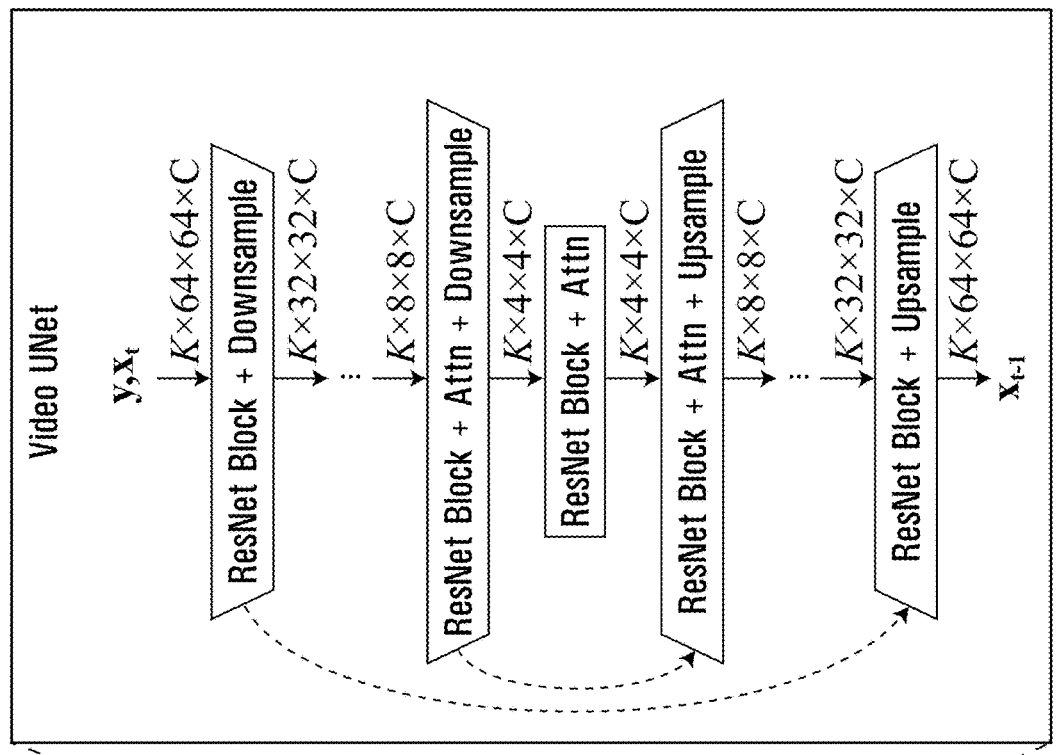
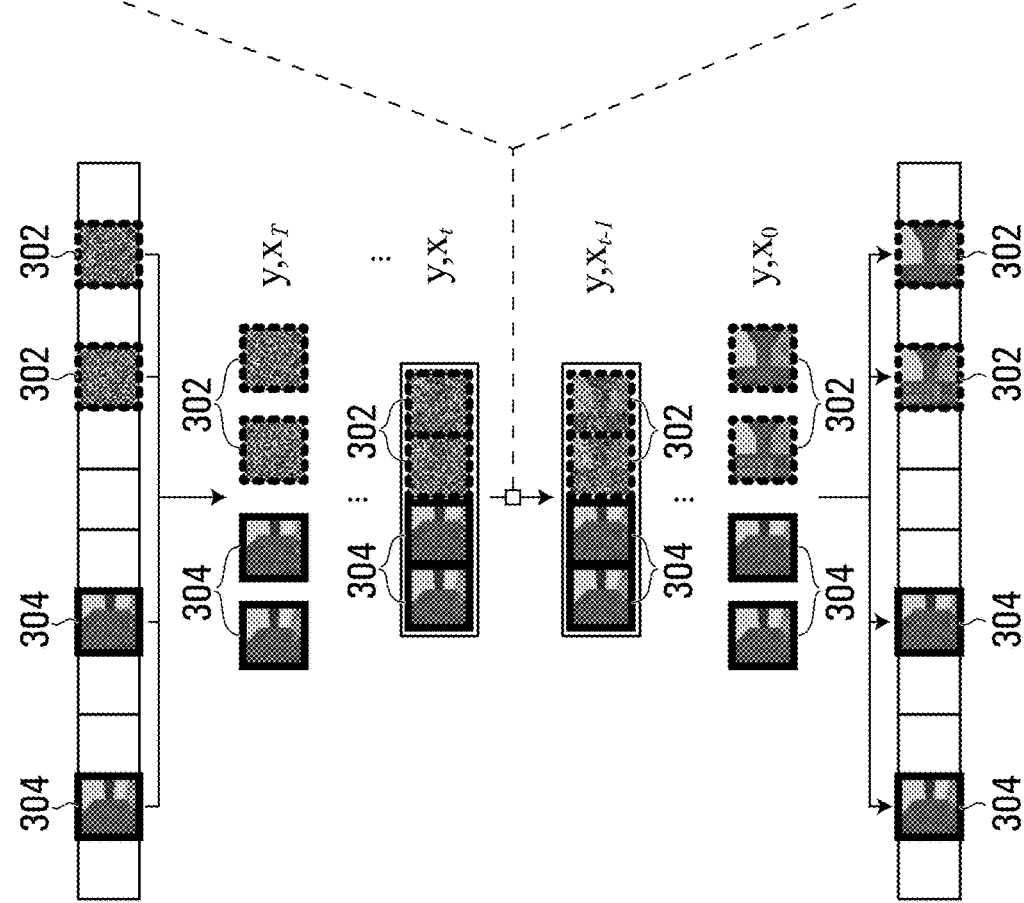
FIG. 3

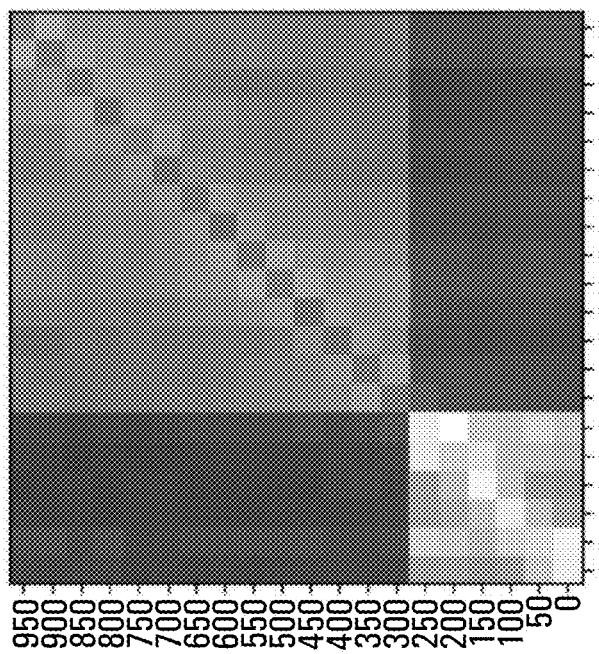
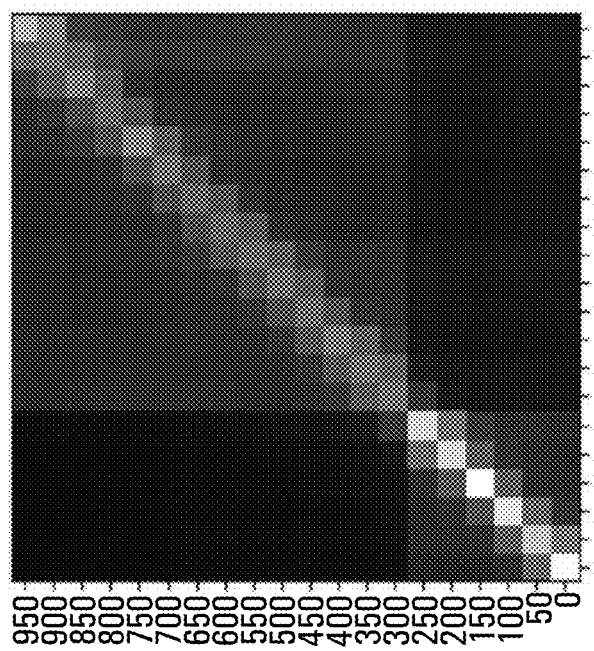
FIG. 7

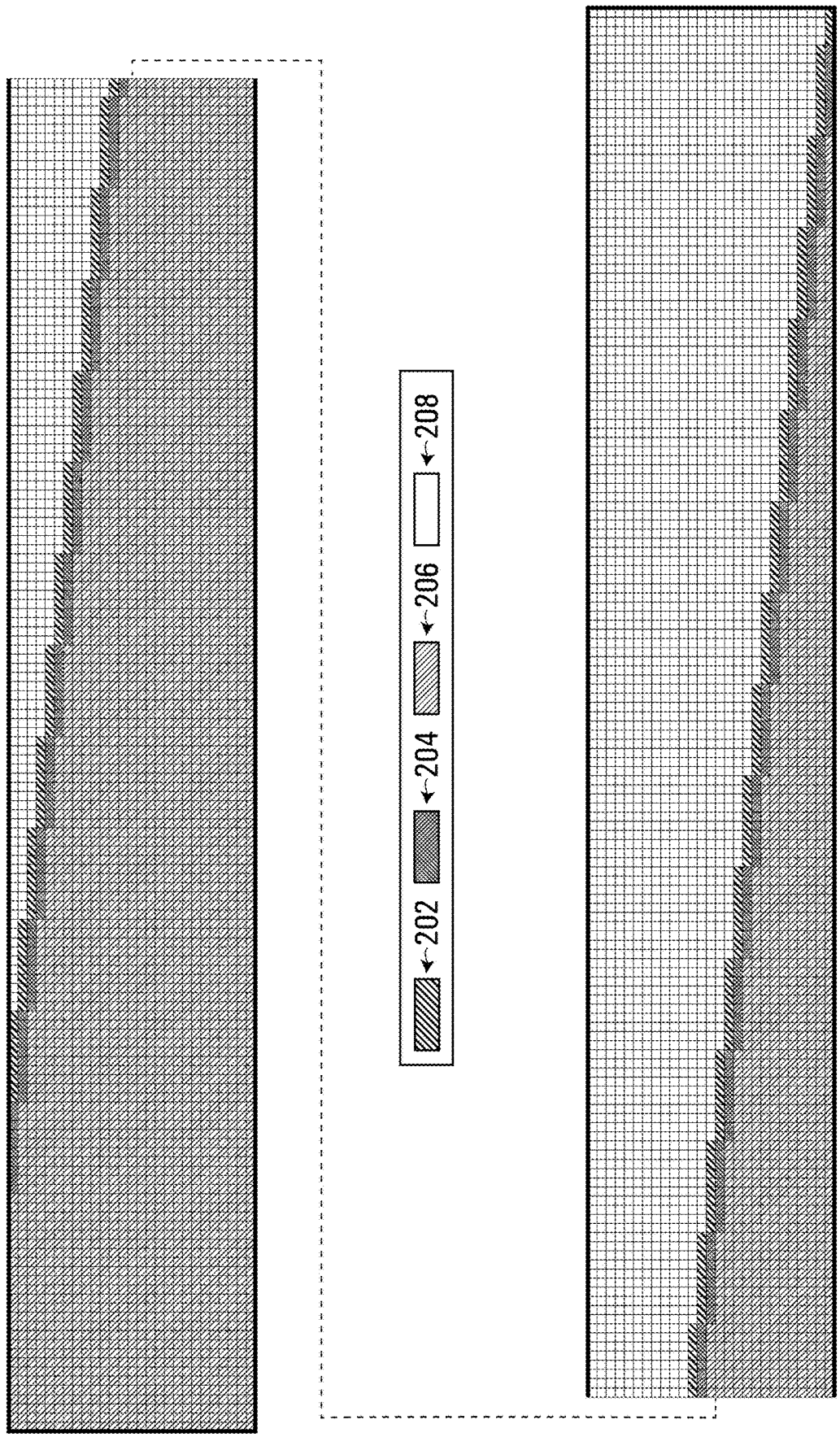

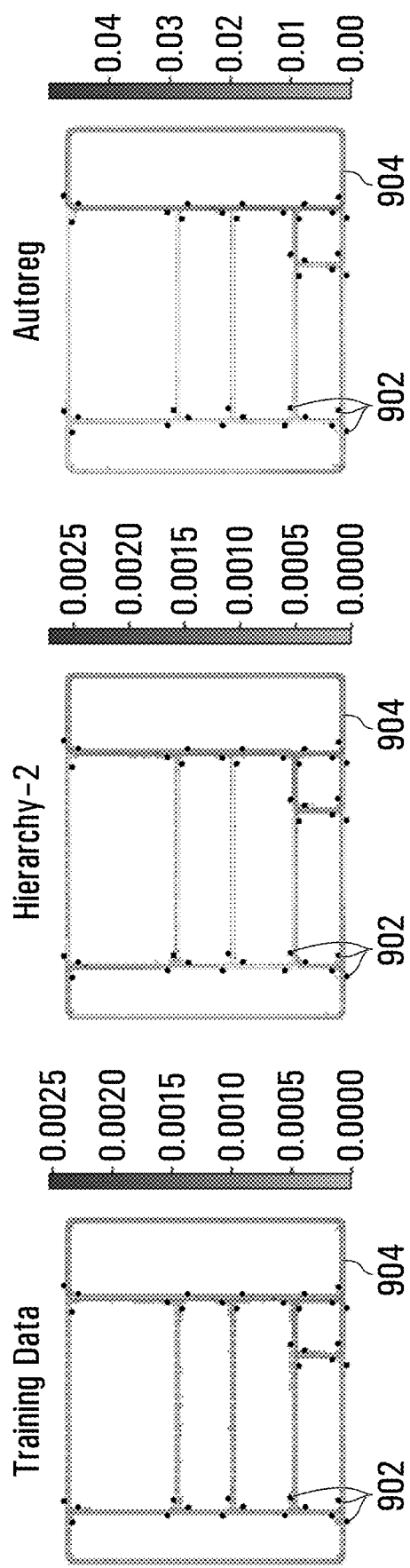

METHOD AND SYSTEM FOR GENERATING ONE OR MORE CONDITIONALLY DEPENDENT DATA ENTRIES

TECHNICAL FIELD

The present disclosure is directed at methods, systems, and techniques for generating one or more conditionally dependent data entries.

BACKGROUND

Conditionally dependent data entries are a sequence of data entries in which each data entry of the sequence is indexed by one or more variables, with the value of at least one of the data entries depending on the value of at least one differently indexed data entry. One example of a sequence of conditionally dependent data entries is a video. Any given frame of the video, and indeed any pixel in that frame, may for example be conditionally dependent on at least one prior video frame. In a more specific example, the values of the pixels of any particular video frame may be a data entry, and the different data entries may effectively be time indexed either explicitly (e.g., by timestamp) or implicitly (e.g., by frame number). In this context, in a video of a car driving along a street, a frame showing the car stopped at an intersection is conditionally dependent on a previous frame showing the car approaching the intersection. Analogously, a future frame showing the car in the intersection is conditionally dependent on the frame showing the car stopped at the intersection.

Continuing with the example of video, generative modeling of photo-realistic videos such as this is at the frontier of what is possible with deep learning on currently-available hardware. Although modeling of short photo-realistic videos (e.g. 30 frames, 48 frames, or 64 frames) has been demonstrated, generating longer videos that are both coherent and photo-realistic remains a technical problem. A major difficulty is scaling: generally speaking, photorealistic image generative models are already close to the memory and processing limits of modern hardware. A long video, for example, is at very least a concatenation of many photorealistic frames, implying resource requirements, long-range coherence notwithstanding, that scale with frame count.

Attempting to model such long-range coherence makes the technical problem harder still to solve, especially because in general every frame can have statistical dependencies on other frames arbitrarily far back in the video. Unfortunately fixed-lag autoregressive models impose unrealistic conditional independence assumptions (the next frame being independent of frames further back in time than the autoregressive lag is problematic for generating videos with long-range coherence). And while deep generative models based on recurrent neural networks ("RNNs") theoretically impose no such conditional independence assumptions, in practice they must be trained over short sequences or with truncated gradients.

These technical problems, while described in the context of video, extend to other data modalities as well. There accordingly exists a need for methods, systems, and techniques to permit computationally efficient generation of conditionally dependent data entries, such as but not limited to video frames.

SUMMARY

According to a first aspect, there is provided a method comprising generating data using a probabilistic generative model, wherein the probabilistic generative model is trained using a plurality of data generation tasks respectively corresponding to a plurality of vectors each comprising a sequence of differently indexed data entries that are conditionally dependent on each other, and wherein each of the data generation tasks comprises generating at least one latent data entry selected from the sequence of data entries in response to being provided at least one index for each of the at least one latent data entry.

The probabilistic generative model may comprise a score based diffusion model.

The score based diffusion model may comprise a denoising diffusion probabilistic model (DDPM).

The differently indexed data entries may be indexed at least by time.

The probabilistic generative model may comprise at least one attention layer, wherein each of the at least one attention layer relates different ones of the differently indexed data entries according to indices or modalities of the differently indexed data entries.

The sequence of data entries may comprise different frames of a video, wherein the at least one attention layer comprises at least one spatial attention layer and at least one temporal attention layer, wherein the at least one spatial attention layer relates different ones of the frames to each other spatially, and wherein the at least one temporal layer relates different ones of the frames to each other temporally.

Relative position encodings may be used to relate different ones of the differently indexed data entries to each other by respective indices of the differently indexed data entries.

The sequence of data entries may comprise different frames of a video, and the relative position encodings may be used to relate different ones of the frames to each other temporally in the at least one temporal layer.

At least one of the data generation tasks may be a conditional data generation task and may comprise providing to the probabilistic generative model at least one observed data entry and at least one corresponding index selected from the sequence of data entries, and generating the at least one latent data entry may be conditioned on the at least one observed data entry and at least one corresponding index.

The at least one corresponding index may comprise a time index, and the time index may be later in time than a corresponding time index of the at least one latent data entry.

The at least one observed data entry and the at least one latent data entry may be of different modalities.

The at least one latent data entry may be unconditionally generated by requiring generating without inputting to the probabilistic generative model a particular one of the data entries on which to condition generation of the at least one latent data entry.

The data may be generated unconditionally by requiring generation without providing an input data sequence to the conditional density estimator on which to condition generation of the data.

Generating the data may be performed conditionally and comprise: providing to the probabilistic generative model an input data sequence comprising at least one data entry and at least one corresponding index of the same type as the at least one data entry and at least one corresponding index used to train the probabilistic generative model; and using the probabilistic generative model to generate at least one new sample data entry over multiple stages conditioned on the at least one data entry and at least one corresponding index provided to the probabilistic generative model.

The conditional density estimator may comprise a denoising diffusion probabilistic model (DDPM), the data entries of the input data sequence may comprise different frames of a video segment, the sample data entries may be sample frames and the data entries on which the sample frames are conditioned are conditional frames, and following the multiple stages a consecutive series of the sample frames may have been added to the video segment.

The at least one new sample data entry may be of a different modality than the at least one data entry on which generation of the at least one new sample data entry is conditioned.

One of the sample frames generated during one of the stages may be used as one of the conditional frames during a subsequent one of the stages.

One of the sample frames may be conditioned on one of the conditional frames that occurs later in time than the one of the sample frames.

The one of the sample frames may also be conditioned on one of the conditional frames that occurs earlier in time than the one of the sample frames.

At least some of the conditional frames may be used to condition the new sample frames for all of the stages.

According to another aspect, there is provided a system comprising: at least one processor; storage, communicatively coupled to the at least one processor; and at least one non-transitory computer readable medium communicatively coupled to the at least one processor, the at least one non-transitory computer readable medium having stored thereon computer program code that, when executed, causes the at least one processor to perform a method comprising: generating data using a probabilistic generative model, wherein the probabilistic generative model is trained using a plurality of data generation tasks respectively corresponding to a plurality of vectors each comprising a sequence of differently indexed data entries that are conditionally dependent on each other, and wherein each of the data generation tasks comprises generating at least one latent data entry selected from the sequence of data entries in response to being provided at least one index for each of the at least one latent data entry; and storing the data that is generated in the storage.

According to another aspect, there is provided a method comprising: performing, over multiple stages: inputting to a probabilistic generative model at least one index respectively corresponding to at least one latent data entry to be generated; generating, using the probabilistic generative model, the at least one latent data entry based on the at least one index corresponding to the at least one data entry, wherein the at least one latent data entry is selected from a sequence of differently indexed data entries that are conditionally dependent on each other; and determining a denoising loss based on the at least one latent data entry; and training the probabilistic generative model based on reducing an overall denoising loss over at least some of the multiple stages.

The training may comprise minimizing an expected value of the overall denoising loss over all of the stages.

The probabilistic generative model may comprise a score based diffusion model.

The score based diffusion model may comprise a denoising diffusion probabilistic model (DDPM).

The differently indexed data entries may be indexed at least by time.

The probabilistic generative model may comprise at least one attention layer, wherein each of the at least one attention layer relates different ones of the differently indexed data entries according to indices or modalities of the differently indexed data entries.

The sequence of data entries may comprise different frames of a video, the at least one attention layer may comprise at least one spatial attention layer and at least one temporal attention layer, the at least one spatial attention layer may relate different ones of the frames to each other spatially, and the at least one temporal layer may relate different ones of the frames to each other temporally.

Relative position encodings may be used to relate different ones of the differently indexed data entries to each other by respective indices of the differently indexed data entries.

The sequence of data entries may comprise different frames of a video, and wherein the relative position encodings may be used to relate different ones of the frames to each other temporally in the at least one temporal layer.

At least one of the data generation tasks may be a conditional data generation task and comprise providing to the probabilistic generative model at least one observed data entry and at least one corresponding index selected from the sequence of data entries, and generating the at least one latent data entry may be conditioned on the at least one observed data entry and at least one corresponding index.

The at least one corresponding index may comprise a time index, and the time index may be later in time than a corresponding time index of the at least one latent data entry.

The at least one observed data entry and the at least one latent data entry may be of different modalities.

The at least one latent data entry may be unconditionally generated by requiring generating without inputting to the probabilistic generative model a particular one of the data entries on which to condition generation of the at least one latent data entry.

According to another aspect, there is provided a system comprising: at least one processor; storage, communicatively coupled to the at least one processor; and at least one non-transitory computer readable medium communicatively coupled to the at least one processor, the at least one non-transitory computer readable medium having stored thereon computer program code that, when executed, causes the at least one processor to perform a method comprising: performing, over multiple stages: inputting to a probabilistic generative model at least one index respectively corresponding to at least one latent data entry to be generated; generating, using the probabilistic generative model, the at least one latent data entry based on the at least one index corresponding to the at least one data entry, wherein the at least one latent data entry is selected from a sequence of differently indexed data entries that are conditionally dependent on each other; and determining a denoising loss based on the at least one latent data entry; and training the probabilistic generative model based on reducing an overall denoising loss over at least some of the multiple stages. The storage may store the data set used to train the probabilistic generative model.

According to another aspect, there is provided a non-transitory computer readable medium comprising computer program code that, when executed, causes at least one processor to perform the above described methods.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 3 depicts how a denoising diffusion probabilistic model iteratively transforms Gaussian noise to video frames, and a U-net architecture used within each step of the denoising diffusion probabilistic model, according to an example embodiment.

FIG. 7 shows the effect of the relative position encodings network on attention weights early in training, according to an example embodiment.

FIGS. 8A-8H depict various sampling schemes, according to example embodiments.

FIGS. 9A-9C depict heat maps of locations visited during videos sampled using various datasets, according to example embodiments.

DETAILED DESCRIPTION

Figure 1:
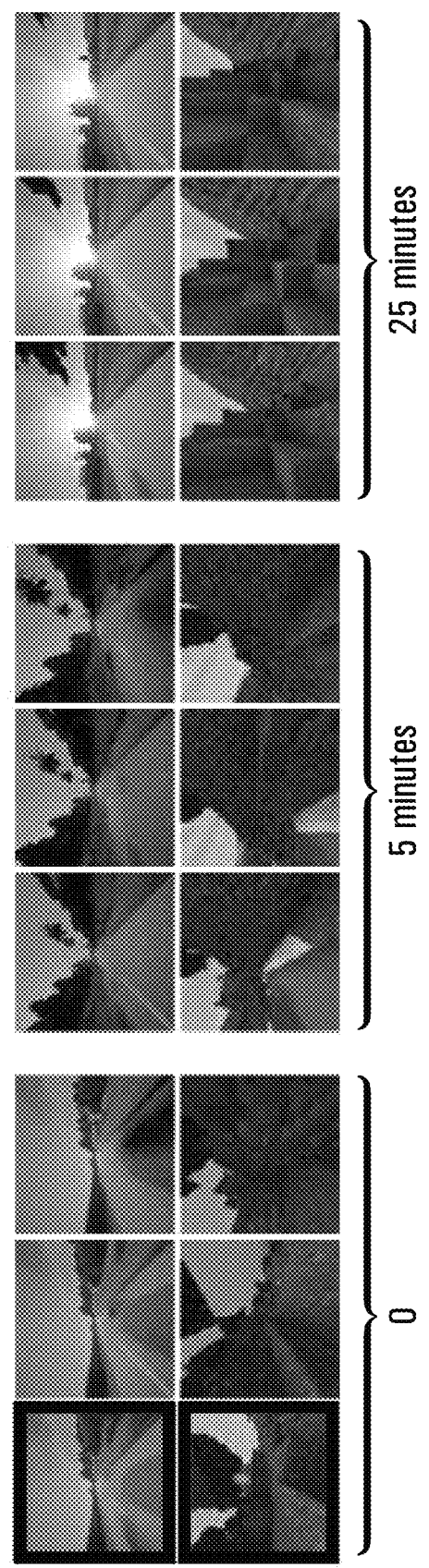
FIG. 1 depicts a long video (25 minutes, or approximately 15,000 frames) generated in accordance with an example embodiment of a method for generating one or more conditionally dependent data entries, in which the conditionally dependent data entries collectively comprise a video.

Described herein are methods, systems, and techniques for data generation using a trained machine learning model in which the data that is generated comprises part of a sequence of differently indexed data entries that are conditionally dependent on each other. This generated data is referred to as "sampled" data, and the act of generating the data is referred to as "sampling" the data. In other words, the data entry that is generated is dependent in some way on at least one of the other data entries, with the data entries collectively representing a progression of a data sequence through one or more indices. Also described herein are methods, systems, and techniques for training a machine learning model to be able to sample the data.

The data entry that is generated (a "sample data entry") may be unconditionally generated; for example, the machine learning model may be trained over a task distribution that comprises unconditional generation, and the sample data entry may accordingly be generated without providing as input to the trained model another data entry (a "conditional data entry") on which the sample data entry is conditioned. Alternatively, at inference, a conditional data entry may be provided to the trained model and the sample data entry may be expressly conditioned on the conditional data entry.

This disclosure embraces the fact that finite architectures will always impose conditional independences. The question asked is: given an explicit limit K on the number of data entries that can be jointly modeled, how are those data entries best allocated to generate a sequence of data entries of length N>K? To enable efficient exploration of the space of such sampling schemes, a flexible architecture based on a probabilistic generative model is proposed. More particularly and as described in further detail below, in at least some example embodiments a score based diffusion model is used as a particular example of a probabilistic generative model, and in still further embodiments a denoising diffusion probabilistic model ("DDPM") framework is used as a particular example of a score based diffusion model. These models, when trained as described herein, can sample any subset of data entries conditioned on observed values of any other subset of data entries. It therefore permits exploration of a wide variety of previously untested sampling schemes while being easily repurposed for different generation tasks such as unconditional generation, data sequence completion, and generation of data sequences of different lengths. Since the model described herein can be flexibly applied to sample any data entries given any others, it is referred to as a Flexible Diffusion Model, or "FDM", herein.

In at least some example embodiments, the data generation described above may be performed in the context of video modeling. In that context, the differently indexed data entries represent different video frames of a video. More particularly, several of the example embodiments described below are directed at a framework for video modeling based on denoising diffusion probabilistic models that produce long-duration video completions in a variety of realistic environments. A generative model that can, at test-time, sample (i.e., generate) any arbitrary subset of video frames conditioned on any other subset is described, and an architecture configured for this purpose is presented. Doing so allows the efficient comparison and optimization of a variety of schedules for the order in which frames in a long video are sampled, and the use of selective sparse and long-range conditioning on previously sampled frames. Improved video modeling over prior work on a number of datasets is demonstrated, and temporally coherent videos over 25 minutes in length are sampled (i.e., generated).

In the example embodiments directed at video generation, a DDPM-based video generative model is described. A previously-used DDPM image architecture [7, 11] is augmented with a temporal attention mechanism including a novel relative (frame) position encoding network. A "meta-learning" training objective that encourages learning of a video generative model that can (a) be flexibly conditioned on any number of frames (up to computational resource constraints) at any time in the past and future and (b) be flexibly marginalized (to achieve this within computational resource constraints) is also described. The DDPM-based model can be used to efficiently explore the space of resource constrained video generation schemes, leading to improvements over prior work on several long-range video modeling tasks.

Sampling Long Data Entries

The present disclosure describes sampling (i.e., generation) of a sequence of indexed data entries numbering in the thousands. A data sequence comprising coherent photorealistic videos v of thousands of frames, indexed by frame number, is used as an illustrative example. This is done in FIG. 1, for example, which depicts a long video (25 minutes, or approximately 15,000 frames) generated using the FDM for each of the CARLA Town01 and MineRL datasets, conditioned on 500 and 250 prior frames, respectively. The CARLA Town01 dataset is discussed in more detail below. Blocks of frames are shown from three points within each video, starting from the final observed frame on the left. Blocks are marked with the time elapsed since the last observation and frames within them are one second apart. No degradation in sample quality is observed even after more than 15,000 frames.

To sample an arbitrarily long video with a generative model that can sample or condition on only a small number of frames at once, a sequential procedure is used. FIGS. 2A-2D depict various example sampling schemes to complete a video of length N=30 conditioned on the first 10 frames, with access to at most K=7 frames at a time. While FIGS. 2A-2D are discussed in the context of frames, more generally they can be applied in at least some example embodiments to other types of data entries. Each stage s of the sampling procedure is represented by one row in the figure, going from top to bottom. Within each subfigure, one column represents one frame of the video, from frame one on the left to frame 30 on the right. At each stage and as indicated in the legend, the values of frames labeled 202 are sampled conditioned on the (observed or previously sampled) values of frames labeled 204; frames labeled 206 are ignored; and frames labeled 208 are yet to be sampled. For every sampling scheme, all video frames have been sampled after the final row.

Figure 2A:
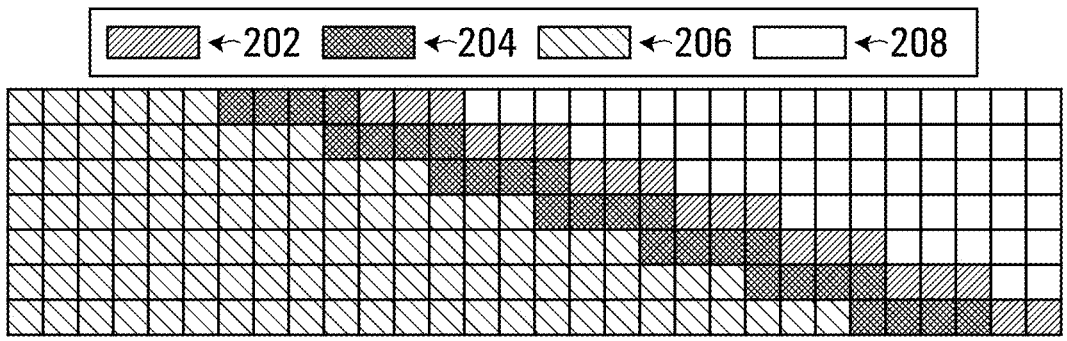
FIGS. 2A-2D depict various example sampling schemes to complete a video, according to example embodiments.
Figure 2B:
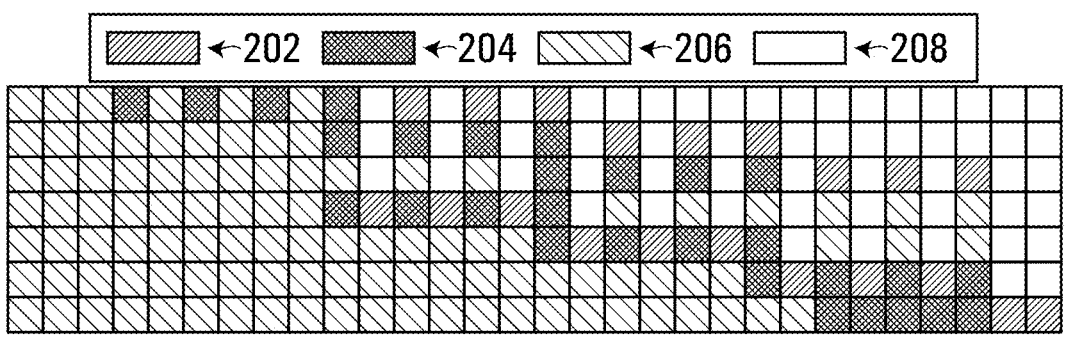

A relatively simple sampling scheme is an autoregressive scheme, an example of which is shown in FIG. 2A for a video completion task. In this example it takes seven stages to sample a complete video, in that the generative model's sampling procedure is run seven times. At each stage three frames are sampled conditioned on the immediately preceding four frames. This scheme is appealing for its simplicity but imposes a strong assumption that, given the set of four frames that are conditioned on at a particular stage, all frames that come afterwards are conditionally independent of all frames that came before. This restriction can be partially ameliorated with the sampling scheme shown in FIG. 2B where, in the first three stages, every second frame is sampled and then, in the remaining four stages, the remaining frames are infilled. One way to implement this would be to train two different models operating at the two different temporal resolutions. In the language of [8], sampling would be carried out in the first three stages by a "frameskip-2" model and, in the remaining stages, by a "frameskip-1" model. Both this approach and the autoregressive approach are examples of what are called sampling schemes. More generally, a sampling scheme is characterized as a sequence of tuples $[(X_s, \mathcal{Y}_s)]_{s=1}^S$, each containing a vector $X_s$ of indices of data entries such as video frames to sample and a vector $\mathcal{Y}_s$ of indices of the data entries to condition on for stages s=1, . . . , S.

While in the video example described in the context of FIGS. 1 and 2A-2D, frames are indexed only by frame number, in other embodiments different and/or multiple indices are possible. For example, instead of simply being indexed by frame number, the data entries may be particular pixels of a video, and the indices may comprise pixel coordinates in addition to frame number. As another example, data entries may be global positioning system (GPS) signal strength, and those entries may be indexed by time, longitude, and latitude. As another example, data entries may be a person's angular joint orientation, and the data entries may be indexed by joint identifier. As another example, data entries may be audio power, and those entries may be indexed by frequency and/or time.

Returning to the example of video, Algorithm 1, below, lays out how such a sampling scheme is used to sample a video, and by extension a data sequence more generally. If the underlying generative model is trained specifically to model sequences of consecutive frames, or sequences of regularly-spaced frames, then the design space for sampling schemes compatible with these models is severely constrained. In contrast, the present disclosure describes a generative model to sample any arbitrarily-chosen subset of video frames conditioned on any other subset and trains it using a novel distribution of such tasks. In short, in at least some embodiments the FDM when applied to video is trained to generate frames for any choice of X and $\mathcal{Y}$. The only constraint imposed on the sampling schemes is therefore a computational consideration that $|X_s|+|\mathcal{Y}_s| \leq K$ for all s but, to generate meaningful videos, in at least some embodiments two more constraints are satisfied: (1) all frames are sampled at at least one stage and (2) frames are never conditioned upon before they are sampled.

---

Algorithm 1 Sample a video v given a sampling scheme $[(X_s, \mathcal{Y}_s)]_{s=1}^S$.
For unconditional generation, the input v can be a tensor of zeros.
For conditional generation, the observed input frames should contain their observed values.

1:    procedure SAMPLEVIDEO (v; θ)
2:    for s ← 1, ..., S do
3:      y ← v[$\mathcal{Y}_s$]                                   ▷ Gather frames indexed by $\mathcal{Y}_s$.
4:      x ~ DDPM(·; y, $X_s$, $\mathcal{Y}_s$, θ)       ▷ Sample x from the conditional DDPM.
5:      v[$X_s$] ← x           ▷ Modify frames indexed by X with their sampled values.
6:    return v

---

Figure 2C:
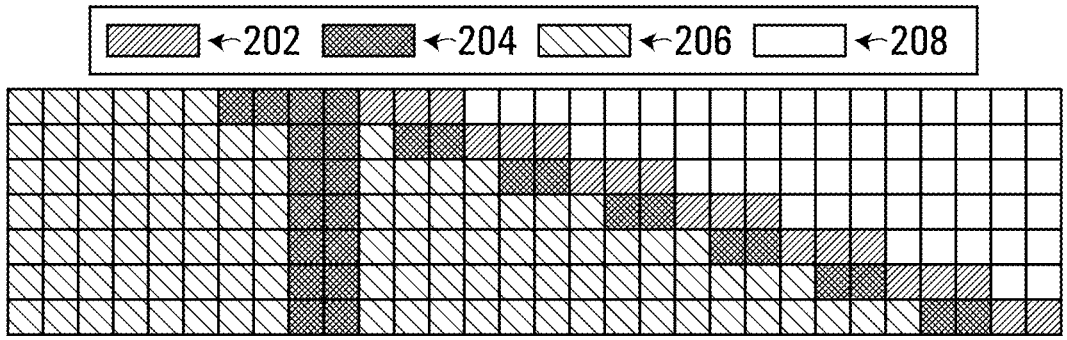
Figure 2D:
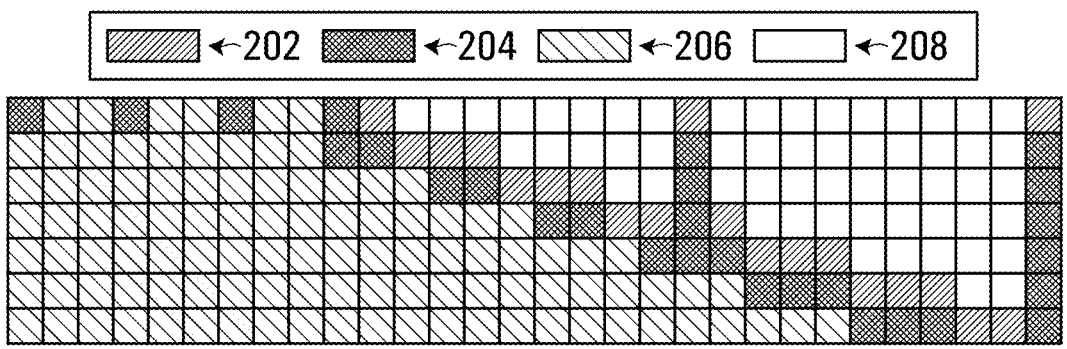

Such a flexible generative model allows the exploration and use of sampling schemes like those in FIGS. 2C and 2D. Experimentally, it has been found that the best video sampling scheme is dataset dependent. Accordingly, methodology to optimize such sampling schemes has been developed in a dataset dependent way, leading to improved video quality as measured by the Fréchet Video Distance among other metrics. Conditional DDPMs are reviewed below, before discussing the FDM's architecture, the specific task distribution used to train it, and the choice and optimization of sampling schemes described further below.

Algorithm 1 may be generalized to a sequence of data entries more generally by replacing v with a vector representing the data entries x, and by replacing the references to "frames" with the particular type of data entry being considered. The reference to the DDPM may also be replaced with a reference to another suitable type of trained model, such as a probabilistic generative model or a score based diffusion model.

A Review of Conditional Denoising Diffusion Probabilistic Models

Denoising diffusion probabilistic models, or DDPMs [19, 7, 11, 21], are a class of generative model for data x, which for example may take the form of a 4-dimensional tensor representing multiple video frames. The conditional extension [22], in which the modeled x is conditioned on observations y, is described below. DDPMs simulate a diffusion process which transforms x to noise, and generate data by learning the probabilistic inverse of the diffusion process. The diffusion process happens over timesteps 0, . . . , T such that $x_0 = x$ is data without noise, $x_1$ has a very small amount of noise added, and so on until $x_T$ is almost independent of $x_0$ and approximates a random sample from a unit Gaussian. The left-hand side of FIG. 3 depicts how a DDPM iteratively transforms Gaussian noise $x_T$ to video frames $x_0$ 302, conditioning on observed frames y 304 at every step.

In the diffusion process considered herein, the distribution over $x_t$ depends only on $x_{t-1}$:

$$q(x_t \mid x_{t-1}) = \mathcal{N}(x_t; \sqrt{\alpha_t}\, x_{t-1}, (1-\alpha_t)I). \quad (1)$$

Hyperparameters $\alpha_1, \ldots, \alpha_T$ are chosen to all be close to but slightly less than 1 so that the amount of noise added at each step is small. The combination of this diffusion process and a data distribution $q(x_0, y)$ (recalling that $x_0 = x$) defines the joint distribution $$q(x_{0:T}, y) = q(x_0, y) \prod_{t=1}^{T} q(x_t \mid x_{t-1}). \quad (2)$$

DDPMs work by "inverting" the diffusion process: given values of $x_t$ and y a neural network is used to parameterize $p_\theta(x_{t-1} \mid x_t, y)$, an approximation of $q(x_{t-1} \mid x_t, y)$. This neural network permits drawing of samples of $x_0$ by first sampling $x_T$ from a unit Gaussian (recall that the diffusion process was chosen so that $q(x_T)$ is well approximated by a unit Gaussian), and then iteratively sampling $x_{t-1} \sim p_\theta(\cdot \mid x_t, y)$ for $t = T, T-1, \ldots, 1$. The joint distribution of sampled $x_{0:T}$ given y is $$p_\theta(x_{0:T} \mid y) = p(x_T) \prod_{t=1}^{T} p_\theta(x_{t-1} \mid x_t, y) \quad (3)$$

where $p(x_T)$ is a unit Gaussian that does not depend on $\theta$. Training the conditional DDPM therefore involves fitting $p_\theta(x_{t-1} \mid x_t, y)$ to approximate $q(x_{t-1} \mid x_t, y)$ for all choices of t, $x_t$, and y.

Several observations have been made in recent years which simplify the learning of $p_\theta(x_{t-1} \mid x_t, y)$. When $\alpha_t$ is close to 1, $p_\theta(x_{t-1} \mid x_t)$ is approximately Gaussian [19]. Furthermore, [7] showed that this Gaussian's variance can be modeled well with a non-learned function of t, and that a good estimate of the Gaussian's mean can be obtained from a "denoising model" as follows. Given data $x_0$ and unit Gaussian noise $\epsilon$, the denoising model (in the form of a neural network) is fed "noisy" data $x_t := \sqrt{\tilde{\alpha}_t} x_0 + \sqrt{1-\tilde{\alpha}_t}\epsilon$ and trained to recover $\epsilon$ via a mean squared error loss. The parameters $\tilde{\alpha}_t := \prod_{i=1}^{t} \alpha_i$ are chosen to ensure that the marginal distribution of $x_t$ given $x_0$ is $q(x_t \mid x_0)$ as derived from Equation (1). Given a weighting function $\lambda(t)$, the denoising loss is $$\mathcal{L}(\theta) = \mathbb{E}_{q(x_0, y, \epsilon)} \left[ \sum_{t=1}^{T} \lambda(t) \|\epsilon - \epsilon_\theta(x_t, y, t)\|_2^2 \right] \text{ with} \quad (4)$$

-continued
$$x_t = \sqrt{\tilde{\alpha}_t}\, x_0 + \sqrt{1-\tilde{\alpha}_t}\, \epsilon.$$

The denoising loss in Equation (4) is for a particular task. Practically, when training a DDPM (or, more generally, a score based diffusion model or a probabilistic generative model), it is the expected value of the loss over all training tasks that is reduced, and ideally minimized, over training in order to set the DDPM's weights.

The mean of $p_\theta(x_{t-1} \mid x_t, y)$ is obtained from the denoising model's output $\epsilon_\theta(x_t, y, t)$ as $$\frac{1}{\alpha_t} x_t - \frac{1-\alpha_t}{\sqrt{1-\tilde{\alpha}_t}} \epsilon_\theta(x_t, y, t).$$

If the weighting function $\lambda(t)$ is chosen appropriately, optimizing Equation (4) is equivalent to optimizing a lower-bound on the data likelihood under $p_\theta$. In practice, simply setting $\lambda(t) := 1$ for all t can produce more visually compelling results in the image domain [7].

In at least some embodiments of the FDM, the shapes of $x_0$ and y sampled from $q(\cdot)$ vary. This is because the intent is to train a model which can flexibly adapt to e.g. varying numbers of observed frames. To map Equation (4) to this scenario, note that both $x_0$ and y implicitly contain information about which frames in the video they represent (via the index vectors X and $\mathcal{Y}$ introduced above). This information is used inside the neural network $\epsilon_\theta(x_t, y, t)$ so that interactions between frames can be conditioned on the distance between them (as described in the following section) and also to ensure that the sampled noise vector $\epsilon$ has the same shape as $x_0$.

Training Procedure and Architecture

Different choices of latent and observed indices X and $\mathcal{Y}$ can be regarded as defining different conditional generation tasks. In this sense, one technical challenge is how to train a model which can work well on any task (i.e. any choice of X and $\mathcal{Y}$). To accomplish this, these vectors of indices are randomly sampled during training from a distribution $u(X, \mathcal{Y})$, whose form is discussed in the following paragraph. Sampling from $q(x_0, y)$ in Equation (4) is then accomplished by randomly selecting both an "entire" data point v and indices $X, \mathcal{Y} \sim u(\cdot, \cdot)$. The latent portion $x = v[X]$ and the portion to condition on, $y = v[\mathcal{Y}]$ (where $v[X]$ denotes the concatenation of all frames in v with indices in X and and $v[\mathcal{Y}]$ similarly) are then extracted.

Reasonable parameterizations of $u(X, \mathcal{Y})$ are now described in the most general setting where the goal is to jointly model data of multiple modalities, e.g. video and the corresponding audio. Modeling data of a single modality (e.g. just video frames or just audio) as described above is a special case of this more general setting. Assume a set of data modalities $\mathcal{M}$. Within each modality $m \in \mathcal{M}$, assume the data can be broken down into $n_m$ units. How to do this is somewhat problem-specific. For video, for example, each frame may be treated as a single unit and $n_m$ may be the number of frames, but alternatively every pixel in every frame may be treated individually so that $n_m$ is the total number of pixels in the video. This may be helpful if at test-time "inpainting" is to be performed where some frames are partially observed. Given such a breakdown of the data, Algorithm 2 below describes a very general parameterization for $u(x,\mathcal{Y})$. It samples without replacement a random number of indices from each modality to include in X, and similarly samples indices to include in $\mathcal{Y}$.

A less broad $u(X,\mathcal{Y})$ may be chosen to specialize to a particular task or to make use of certain datasets. For example, if a model is to be trained over multiple modalities (e.g. video and audio) but some of the training examples consist of a single modality (e.g. pure audio), they can be better leveraged if $u(X,\mathcal{Y})$ is adapted to more frequently sample $(X,\mathcal{Y})$ pairs that include indices from only a single modality (which would be uncommon under Algorithm 2 if all $n_m$ are large). Alternatively if it is known that, at test-time, the goal is always to generate video conditioned on audio, the training task distribution may be specialized by ensuring that the audio modality is always fully observed. Finally, a heuristic task distribution is described below in Algorithm 3 which is designed to assign high probability to the types of task involved in the sampling schemes used at test-time and limit the size of X and $\mathcal{Y}$ to satisfy memory constraints. This is the training task distribution used for the remainder of this disclosure, unless specified otherwise.

---

Algorithm 2 Sampling training tasks $(X,\mathcal{Y})$ from a uniform distribution given $n_m$-dimensional data points.

1:   for m ∈ $\mathcal{M}$ do   ▷ Iterate over modalities
2:     $k_x$ ~ UniformDiscrete(1, $n_m$)
3:     $X_m$ ~ SampleWithoutReplacement($k_x$, {1, ..., $n_m$})
4:     $k_y$ ~ UniformDiscrete(0, K – $k_x$)
5:     $\mathcal{Y}_m$ ~ SampleWithoutReplacement($k_y$, {1, ..., $n_m$})\ $X_m$)
6:   X := [$X_m$ for m ∈ $\mathcal{M}$]
7:   $\mathcal{Y}$ := [$\mathcal{Y}_m$ for m ∈ $\mathcal{M}$]
8:   return X, $\mathcal{Y}$

---

Algorithm 3 Sampling training tasks $(X,\mathcal{Y})$ ~ $u(\cdot)$ from a more peaked distribution given N, K, and a set of modalities $\mathcal{M}$.

1:   $\mathcal{F}$ := { }   ▷ Set of all used frame indices
2:   for m ∈ $\mathcal{M}$ do
3:     $X_m$ := { }   ▷ Indices where modality m is latent
4:     $\mathcal{Y}_m$ := { }   ▷ Indices where modality m is observed
5:   while True do
6:     $n_{group}$ ~ UniformDiscrete(1, K)
7:     $s_{group}$ ~ LogUniform(1, (N – 1)/$n_{group}$)
8:     $x_{group}$ ~ Uniform(0, N – ($n_{group}$ – 1) · $s_{group}$)
9:     $\mathcal{G}$ := [$x_{group}$ + $s_{group}$ · i]|i ∈ {0, ..., $n_{group}$ – 1}\$\mathcal{F}$
10:     if |$\mathcal{F}$| + |$\mathcal{G}$| > K then
11:       break   ▷ New indices do not fit; return
12:     $\mathcal{F}$ := $\mathcal{F}$ ∪ $\mathcal{G}$
13:     for m ∈ $\mathcal{M}$ do
14:       mode ~ Uniform({lat, obs, none})
15:       if mode = lat then
16:         $X_m$ := $X_m$ ∪ $\mathcal{G}$
17:       if mode = obs then
18:         $\mathcal{Y}_m$ := $\mathcal{Y}_m$ ∪ $\mathcal{G}$
19:   X: = [$X_m$ for m ∈ $\mathcal{M}$]
20:   $\mathcal{Y}$: = [$\mathcal{Y}_m$ for m ∈ $\mathcal{M}$]
21:   return X, $\mathcal{Y}$

---

Algorithms 2 and 3 are pseudocode for two distributions, either of which is capable of generating these samples. Algorithm 2 shows a uniform distribution which stochastically groups data entries by indices {1, ..., $n_m$} into those that are latent, those that are observed, and those that are neither. It does so independently for each modality m. Algorithm 3 represents a more structured distribution which assigns higher probability to the tasks that FDM is used for at test-time. The while loop iterates over a series of regularly-spaced groups of latent variables. Each group is parameterized by: the number of indices in it, $n_{group}$; the spacing between indices in it, $s_{group}$; and the position of the first frame in it, $x_{group}$. These quantities are sampled in a continuous space and then discretized to make a set of integer coordinates on line 3. Within each group, each data entry is sampled to be either latent, observed, or non-existing with equal probability. The process repeats until a group is sampled which, if added to F, will cause the number of frames to exceed K. That group is then discarded and the sets of latent and observed frames within each modality are returned. The FDM's training objective forces it to work well for any task from this broad distribution.

DDPM image models [7, 11] typically use a U-net architecture [14]. Its distinguishing feature is a series of spatial downsampling layers followed by a series of upsampling layers, and these are interspersed with convolutional res-net blocks [6] and spatial attention layers. Since an architecture which operates on 4-D video tensors rather than 3-D image tensors is required, an extra frame dimension is added to its input, output and hidden state, resulting in the architecture shown on the right-side of FIG. 3. More particularly, the right-side of FIG. 3 depicts the U-net architecture used within each DDPM step; it computes $\epsilon_\theta(x_t,y,t)$, with which the Gaussian transition $p_\theta(x_{t-1}|x_t)$ is parameterized.

The input to this architecture is a concatenation $x_t \oplus y$, adding an extra input channel which is all ones for observed frames and all zeros for latent frames. For RGB video, the input shape is therefore (K, imageheight, imagewidth, 4). Since the output should have the same shape as $x_t$ only outputs corresponding to the latent frames are returned, giving output shape (|X|, imageheight, imagewidth, 3). All layers from the original model (including convolution, resizing, group normalization, and spatial attention) are run independently for each of the K frames. To allow communication between the frames, a temporal attention layer is added after each spatial attention layer, described in more detail below. The spatial attention layer allows each spatial location to attend to all other spatial locations within the same frame, while the temporal attention layer allows each spatial location to attend to the same spatial location across all other frames. This combination of a temporal attention layer with a spatial attention layer is sometimes referred to as factorized attention [22, 8]. When using this architecture in conjunction with a meta-learning approach, it was discovered that performance could be improved by using a novel form of relative position encoding [18, 26]. This is discussed further below.

Figure 4:
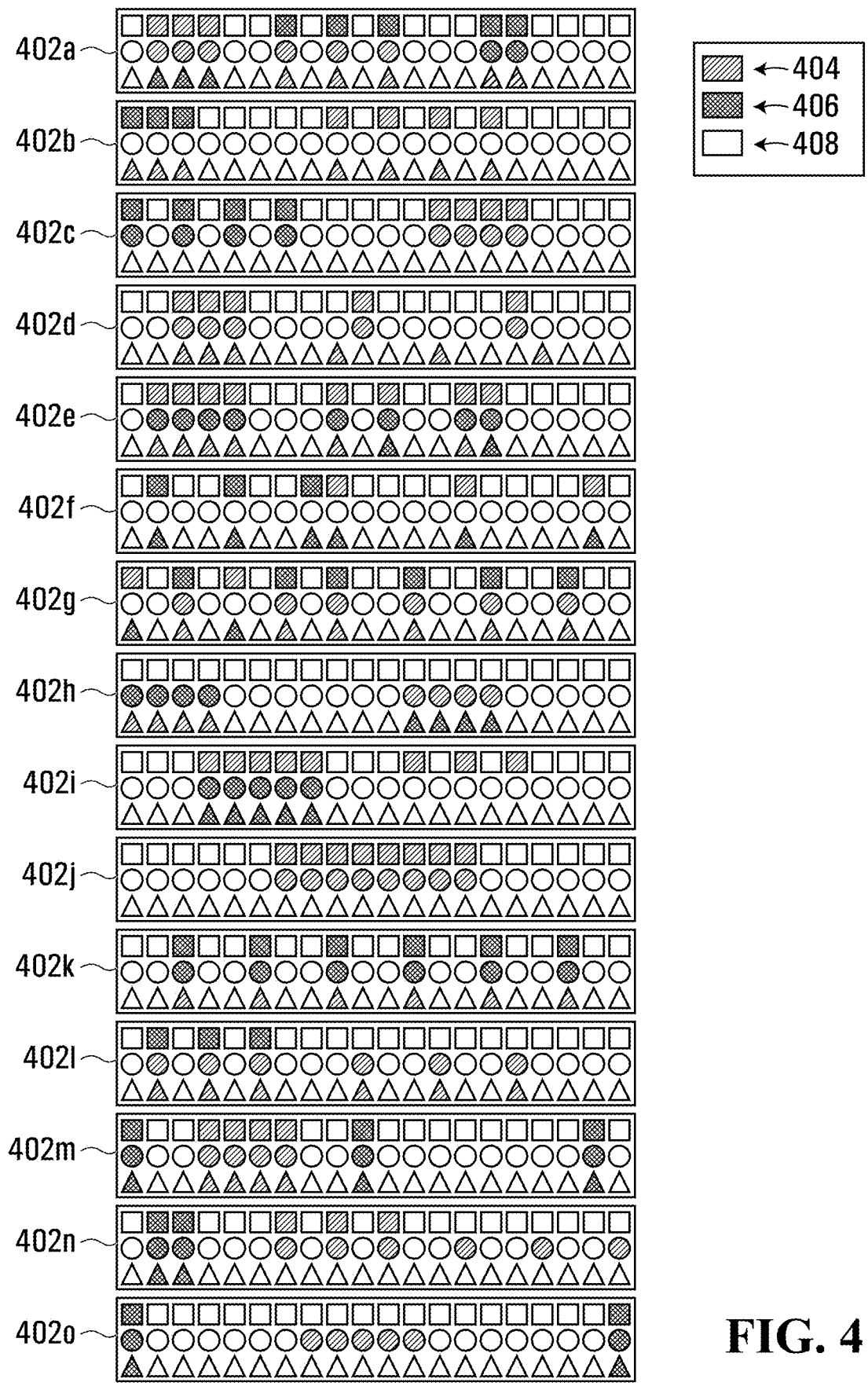
FIG. 4 depicts data entries used for multi-modal training, according to an example embodiment.

In at least some embodiments, the method described herein is designed for jointly modeling multiple data modalities, such as video and audio data. FIG. 4 shows example tasks for a model with 3 modalities. FIG. 4 depicts samples from $u(X,\mathcal{Y})$ with video length N=30, limit K=10 on the number of sampled indices, and |$\mathcal{M}$|=3 modalities. Each of blocks 402a-o represents one sampled task on a problem with three modalities. Each column represents one "frame" (with the first on the left and the Nth on the right) and each shape represents a different data modality. For example each square may represent one video frame; the circle below it may represent the corresponding segment of audio; and the triangle below that may represent a GPS coordinate. The frames labeled 404 and 406 denote latent and observed frames respectively. The frames labeled 408 are ignored and treated as neither latent or observed.

This can be generalized to model arbitrarily many or few modalities. This disclosure focuses on the video modality. Audio may also be incorporated [15]; for example, using cross-attention layers and their architecture may be combined with the training task distribution by setting inputs to zero if they correspond to indices not in X or $\mathcal{Y}$. Diffusion models have been applied to many other modalities, e.g. neural embeddings or matrices [25]. These architectures may be integrated with the video architecture disclosed herein using cross-attention layers such as those of [15]. There are many other modalities that could reasonably be modeled. In a reinforcement learning-style setting, an agent's action's (e.g. acceleration and steering wheel angle for our proposed autonomous driving dataset) or an agent's state (e.g. via GPS coordinates) may be modeled. For the purposes of clear exposition and simple experimentation, the embodiments described below focus on the single-modality video case; therefore, from now on, X refers to the set of indices of latent video frames and $\mathcal{Y}$ refers to the set of indices of observed video frames.

Although the size $|X \oplus \mathcal{Y}|$ of index vectors sampled from the training distribution is bounded above by K, it can vary. To fit examples with various sizes of index vectors into the same batch, one option is to pad them all to length K with zeros and use masks so that the zeros cannot affect the loss. This, however, wastes computation on processing tensors of zeros. Instead, this computation may be used to obtain a lower-variance loss estimate by processing additional data with "training batch padding". This means that, for training examples where $|X \oplus \mathcal{Y}| < K$, frames are concatenated uniformly sampled from a second video to increase the length along the frame-dimension to K. Masks are applied to the temporal attention mechanisms so that frames from different videos cannot attend to each other and the output for each is the same as that achieved by processing the videos in different batches.

Figure 8B:
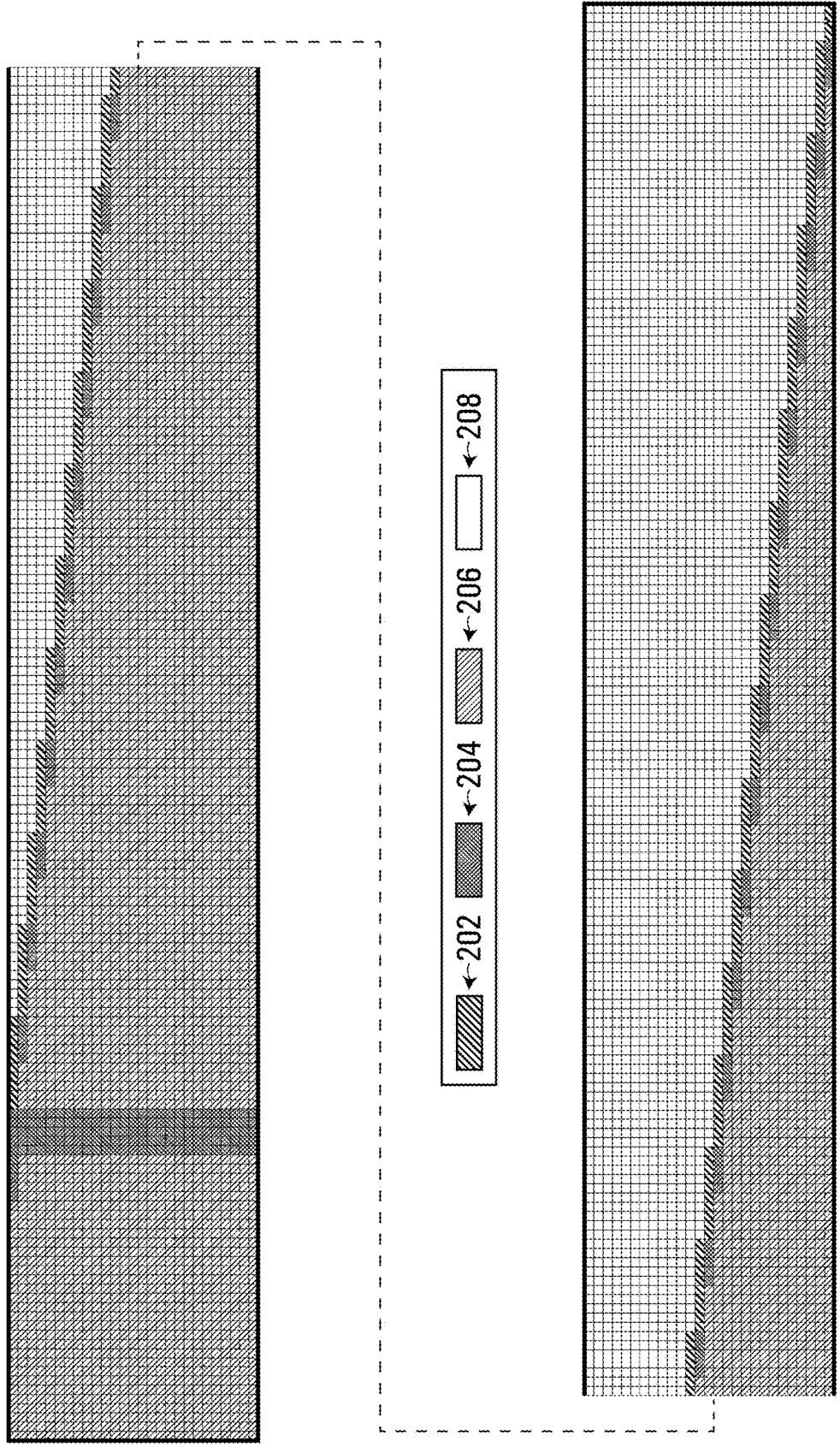
Figure 8C:
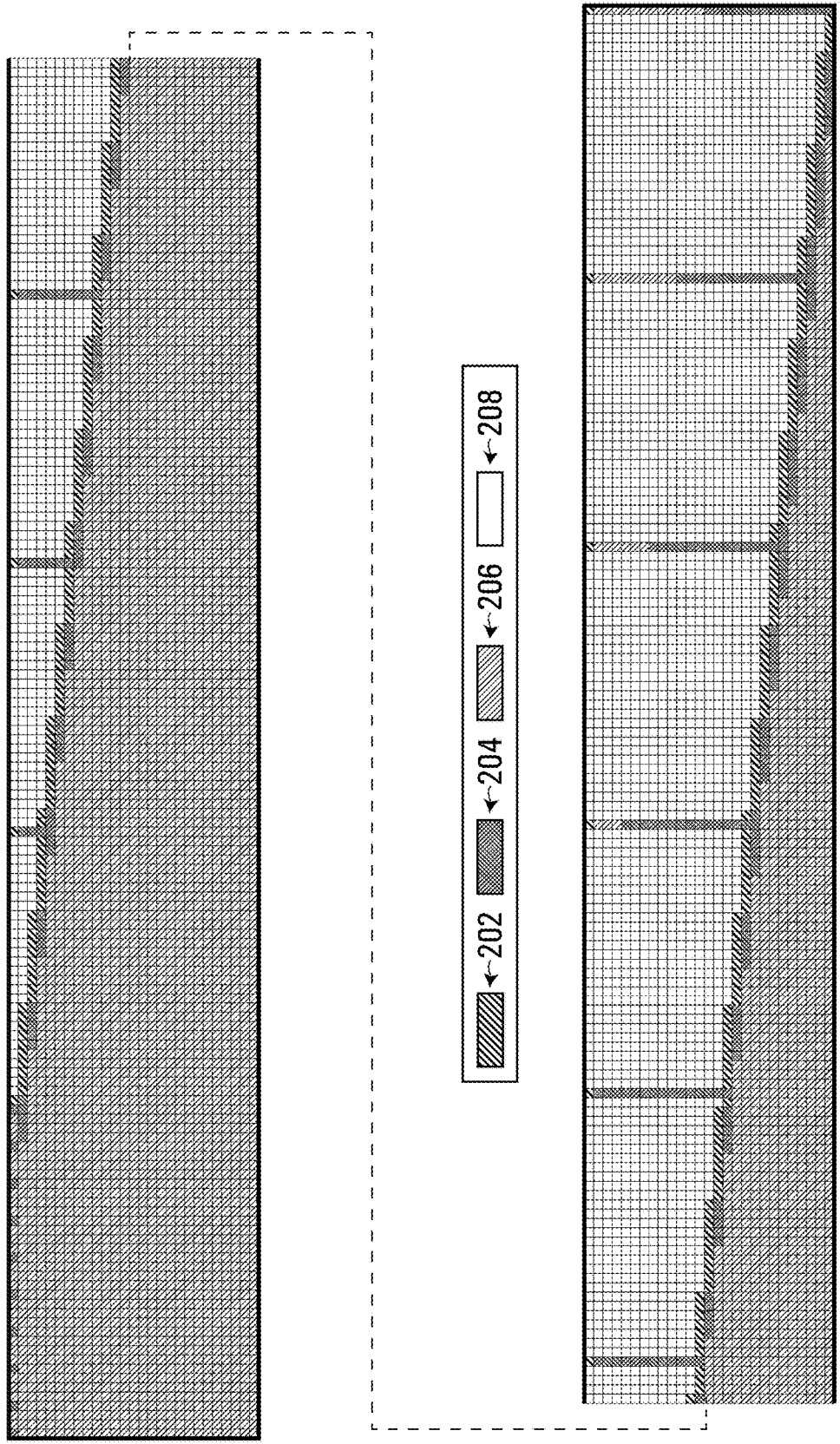
Figure 8D:
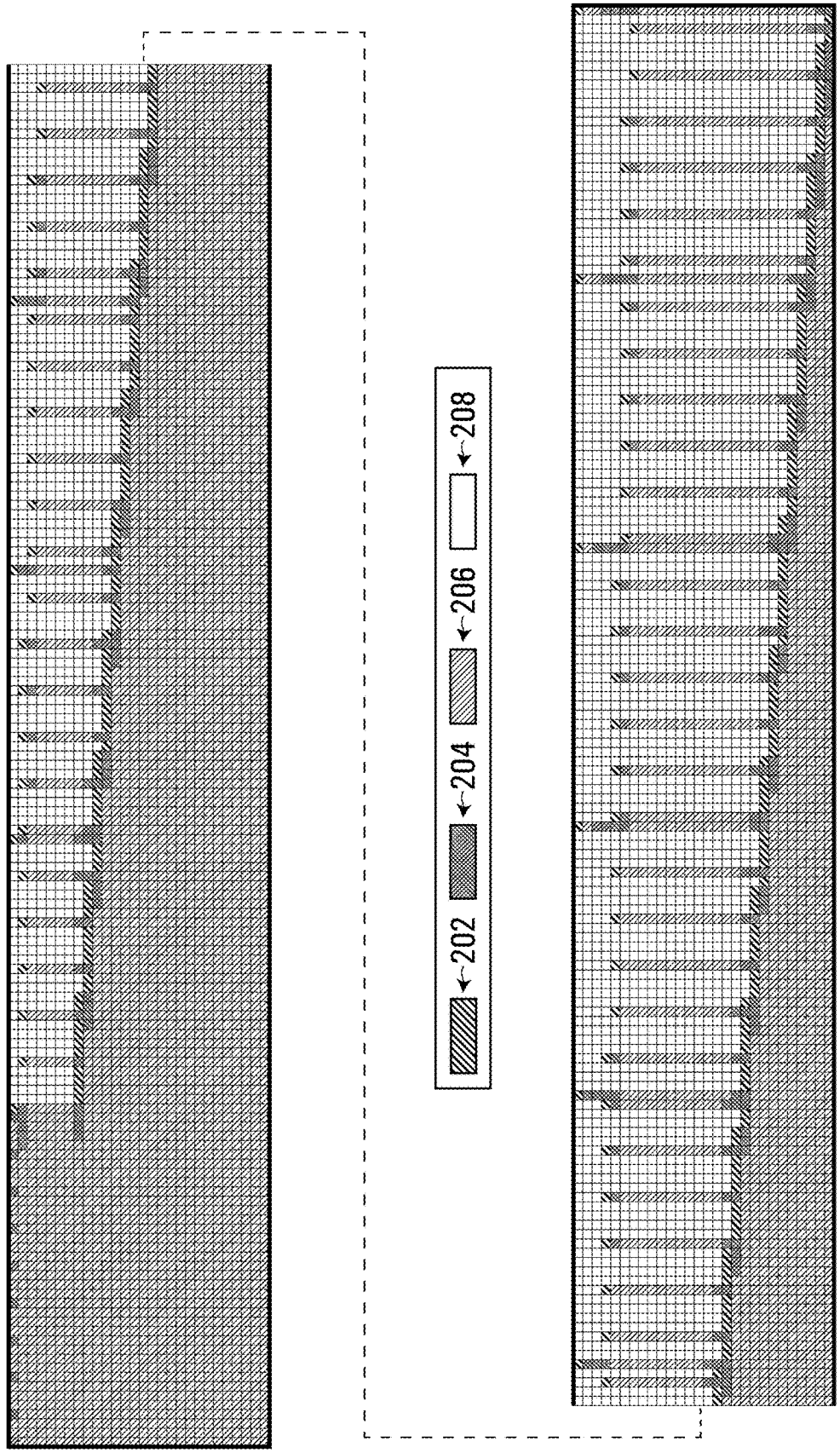
Figure 8E:
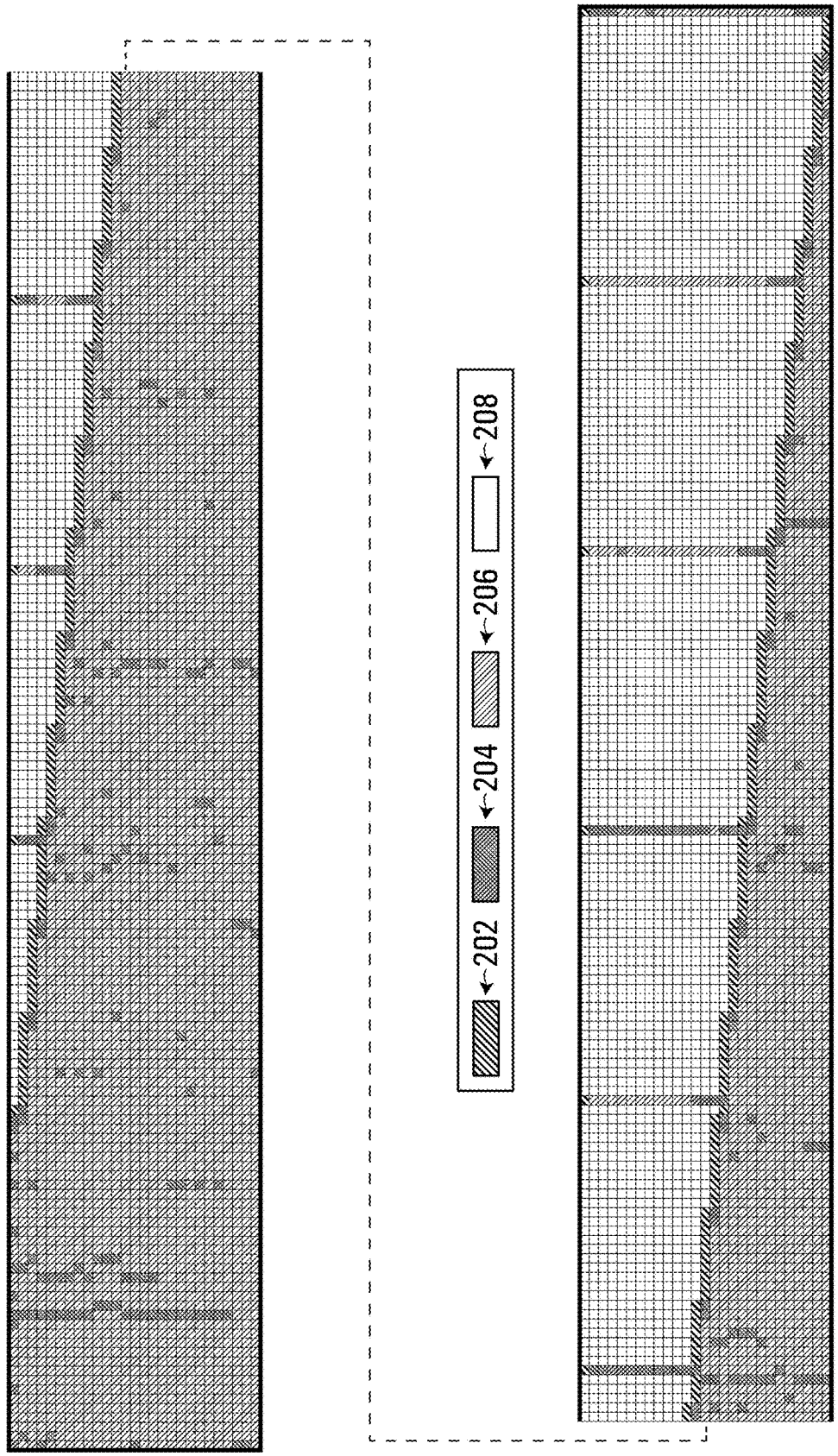

The relative performance of a sampling scheme is dataset-dependent and there is no single best choice. A central benefit of FDM is that it can be used at test-time with different sampling schemes without retraining. The simplest sampling scheme described herein, Autoreg (FIG. 8A), samples ten consecutives frames at each stage conditioned on the previous ten frames. Long-range (FIG. 8B) is similar to Autoreg but conditions on only the five most recent frames as well as five of the original 36 observed frames. Hierarchy-2 (FIG. 8C) uses a multi-level sampling procedure. In the first level, ten evenly spaced frames spanning the non-observed portion of the video are sampled (conditioned on ten observed frames). In the second level, groups of consecutive frames are sampled conditioned on the closest past and future frames until all frames have been sampled. Hierarchy-3 (FIG. 8D) adds an intermediate stage where several groups of variables with an intermediate spacing between them are sampled. Adaptive hierarchy-2 (FIG. 8E), abbreviated Ad. hierarchy-2, is included as a demonstration of a sampling scheme only possible with a model like FDM. It samples the same frames at each stage as Hierarchy-2 but selects which frames to condition on adaptively at test-time with a heuristic aimed at collecting the maximally diverse set of frames, as measured by the pairwise LPIPS distance [28] between them.

Figure 8F:
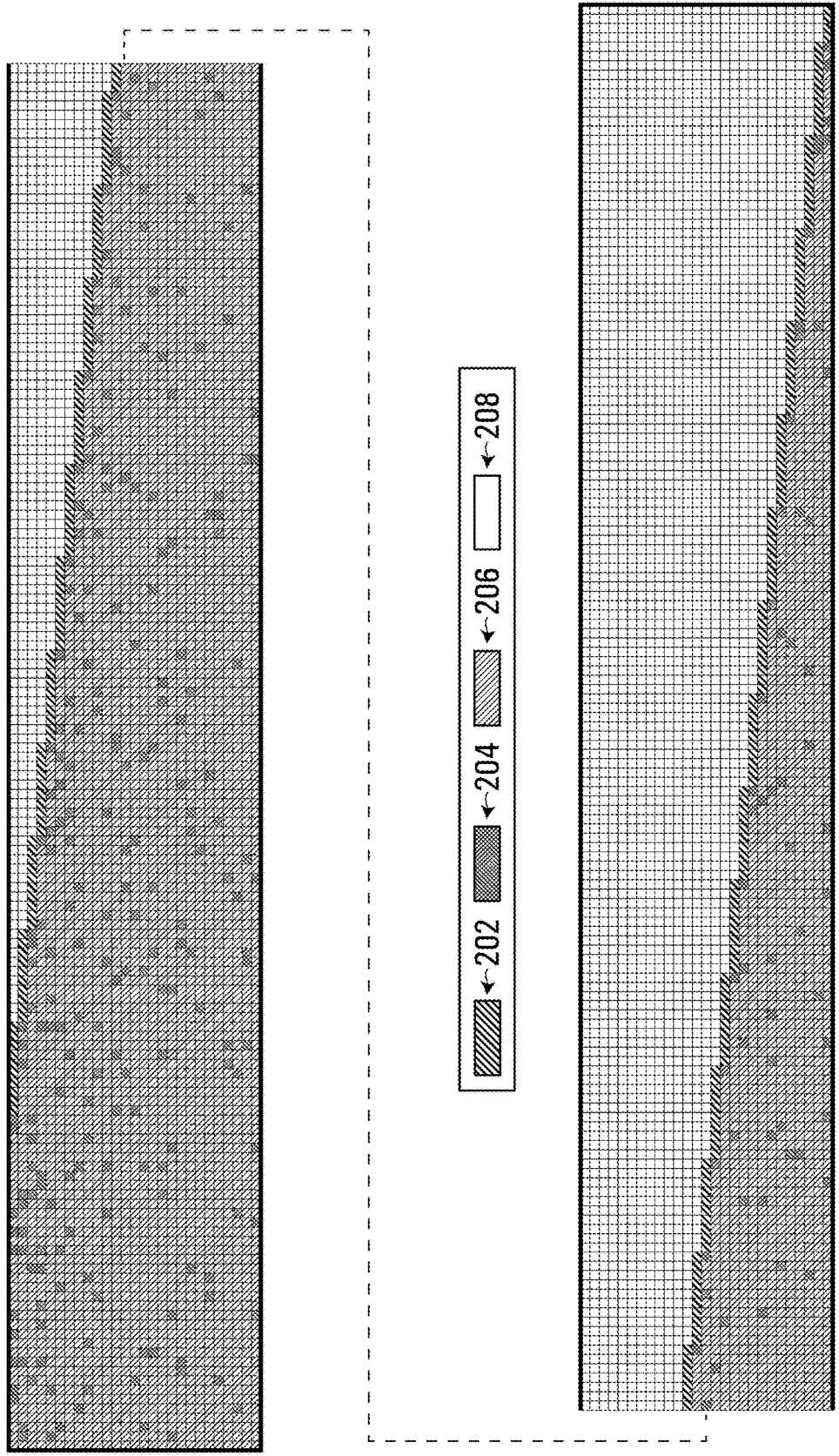
Figure 8G:
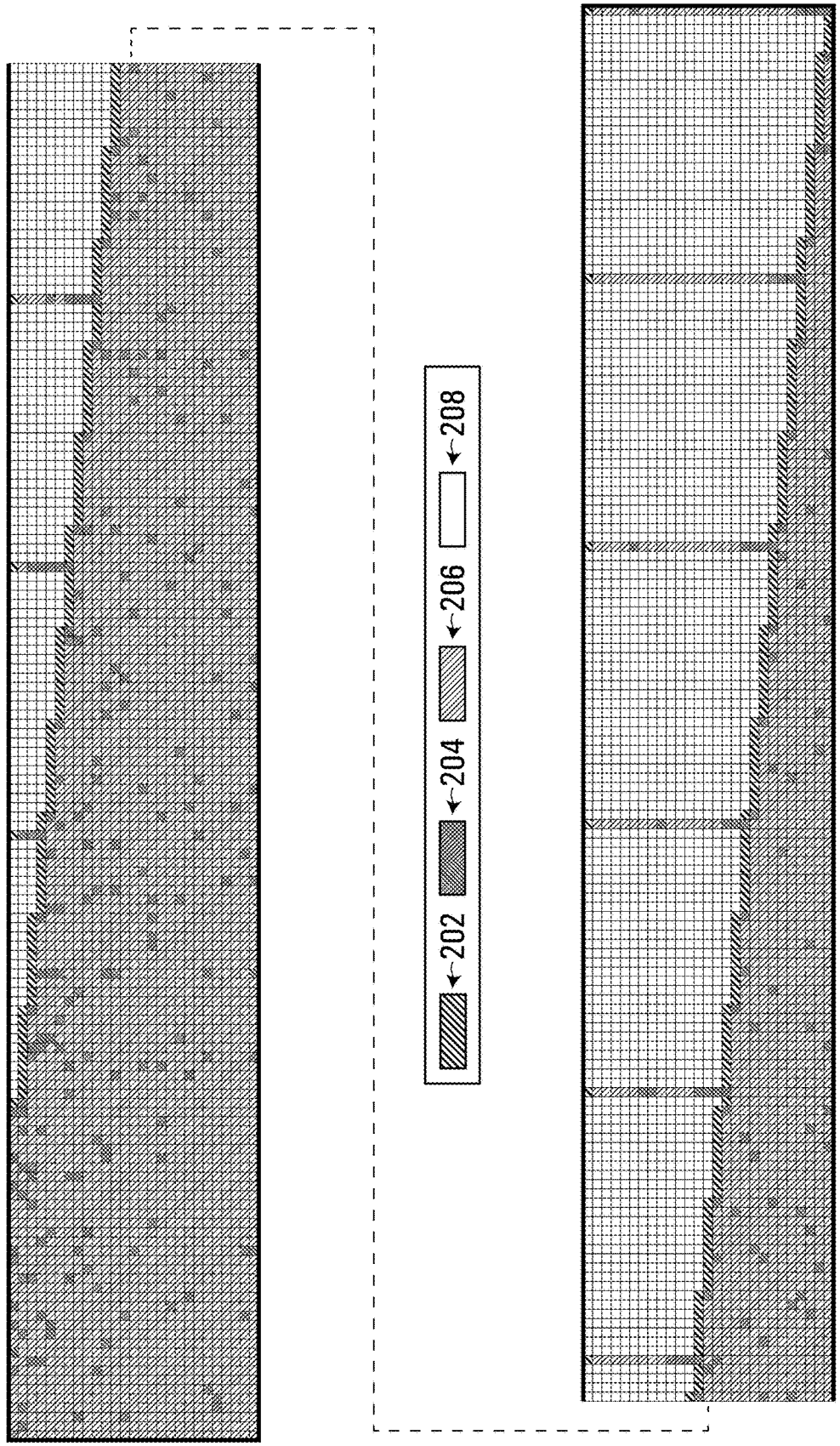
Figure 8H:
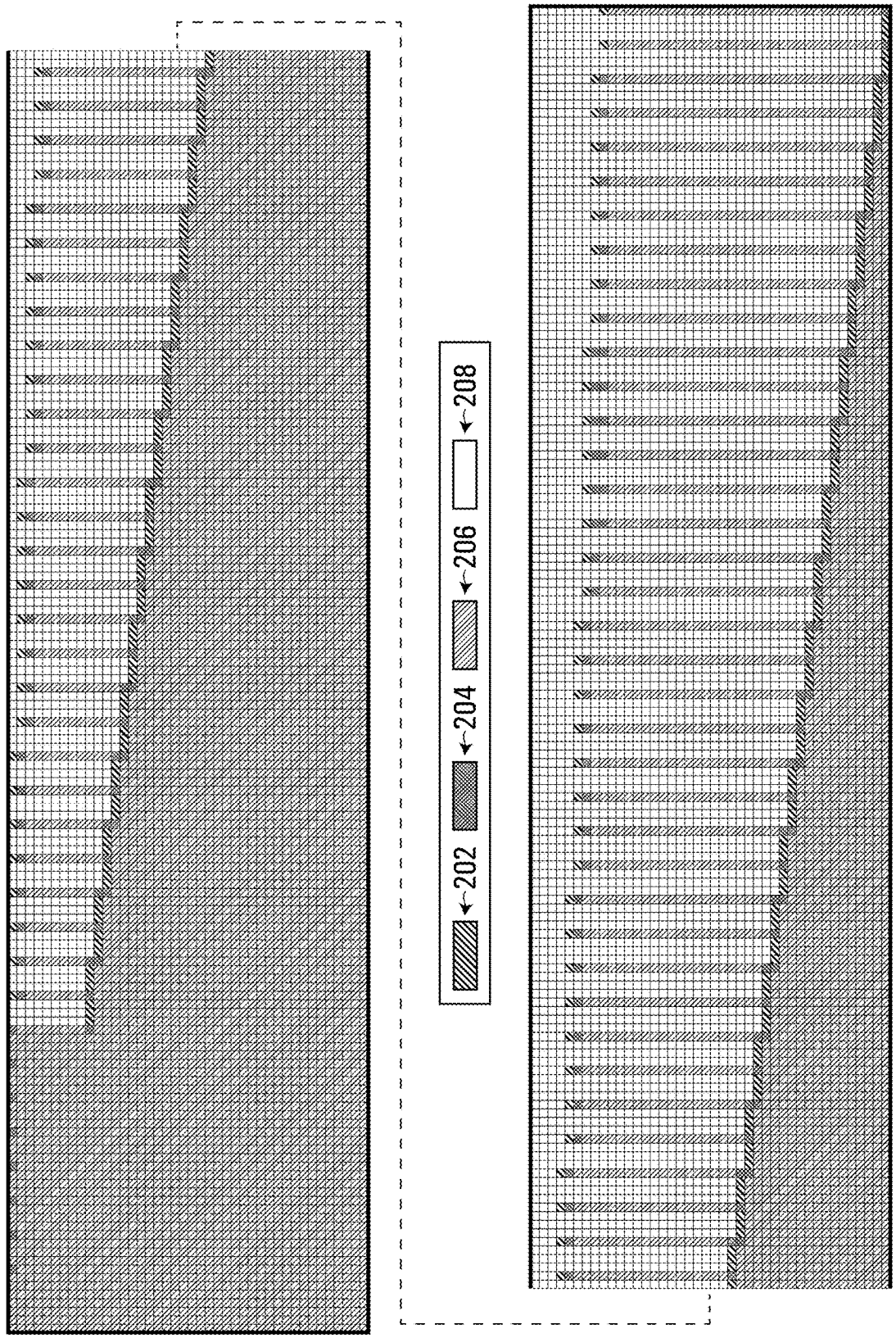

An appealing alternative to the heuristic sampling schemes described in the previous paragraph would be to find a sampling scheme that is, in some sense, optimal for a given model and video generation/completion task. While it is unclear how to tractably choose which frames should be sampled at each stage, the frames to condition on at each stage may be chosen by greedily optimizing the diffusion model loss which, as mentioned above, is closely related to the data log-likelihood. Given a fixed sequence of frames to sample at each stage $[X_s]_{s=1}^{S} \mathcal{Y}_s$ may be selected for each s to minimize Equation (4). This is estimated using a set of 100 training videos and by iterating over 10 evenly-spaced values of t (which reduced variance relative to random sampling of t). This is described in more detail below. Two optimized sampling schemes are created: one with the same latent indices as Autoreg, and one with the same latent indices as Hierarchy-2. The corresponding optimized schemes are called Opt. autoreg (FIG. 8F) and Opt. hierarchy-2 (FIG. 8G).

Experiments

The main comparisons are performed on a video completion task. In keeping with [17], the first 36 frames of each video are conditioned on, and the remainder are sampled. Results are presented on three datasets: GQN-Mazes [3], in which videos are 300 frames long; MineRL Navigate [5, 17] (interchangeably referred to herein as simply "MineRL"), in which videos are 500 frames long; and the CARLA Town01 dataset, for which videos are 1000 frames long. The FDM is trained in all cases with the maximum number of represented frames K=20.

The relative performance of different sampling schemes varies significantly between datasets as shown in Table 1. Table 1 summarizes an evaluation on video completion with various modes of an example embodiment of the method along with baselines from the literature. Error bars denote the standard error computed with 5 random seeds. Higher is better for the accuracy metric and lower is better for all other metrics shown.

Fréchet Video Distances (FVDs) [23], a measure of how similar sampled completions are to the test set, are reported on all datasets. In addition on GQN-Mazes the accuracy metric [17], which classifies videos based on which rooms are visited and measures how often a completion is given the same class as the corresponding test video, is reported. For CARLA Town01 the previously described percentage outliers (PO) and Wasserstein distance (WD) metrics are reported.

TABLE 1

Experimental Results of Example Method vs. Baselines from Literature

| Model | Sampling scheme | GQN-Mazes | | MineRL | CARLA Town01 | | |
| --- | --- | --- | --- | --- | --- | --- | --- |
| | | FVD | Accuracy | FVD | FVD | WD | OP |
| CWVAE [17] | CWVAE | 837 ± 8 | 82.6 ± 0.5 | 1573 ± 5 | 1161 | 0.666 | 44.4 |
| TATS [4] | TATS | 163 ± 2.6 | 77.0 ± 0.8 | 807 ± 14 | 329 | 1.648 | 42.4 |
| VDM [8] | VDM | 66.7 ± 1.5 | 77.8 ± 0.5 | 271 ± 8.8 | 169 | 0.501 | 16.9 |

TABLE 1-continued

Experimental Results of Example Method vs. Baselines from Literature

| | | GQN-Mazes | | MineRL | CARLA Town01 | | |
| --- | --- | --- | --- | --- | --- | --- | --- |
| Model | Sampling scheme | FVD | Accuracy | FVD | FVD | WD | OP |
| FDM (example embodiment) | Autoreg | 86.4 ± 5.2 | 69.6 ± 1.3 | 281 ± 10 | 222 | 0.579 | 0.51 |
| | Long-range | 64.5 ± 1.9 | 77.0 ± 1.4 | 267 ± 4.0 | 213 | 0.653 | 0.47 |
| | Hierarchy-2 | 53.1 ± 1.1 | 82.8 ± 0.7 | 275 ± 7.7 | 120 | 0.318 | 3.28 |
| | Hierarchy-3 | 53.7 ± 1.9 | 83.8 ± 1.1 | 311 ± 6.8 | 149 | 0.363 | 4.53 |
| | Ad. hierarchy-2 | 55.0 ± 1.4 | 83.2 ± 1.3 | 316 ± 8.9 | 117 | 0.311 | 3.44 |

Figure 5:
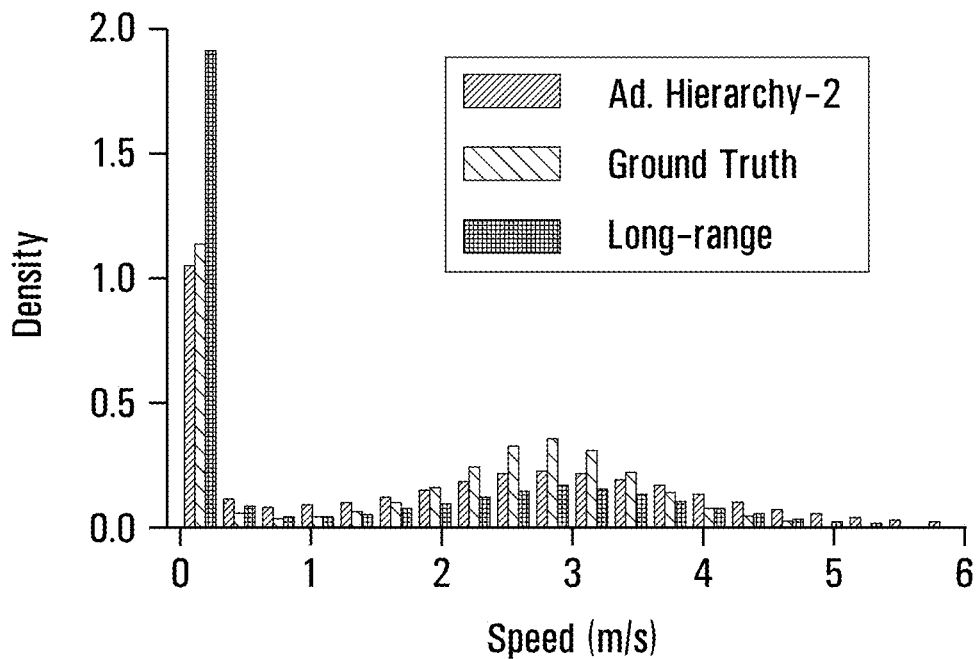
FIG. 5 is a graph of speed distributions measured from sampled and ground-truth dataset videos, according to an example embodiment.

The aforementioned sampling schemes can be broadly considered as either being in the "autoregressive" family (Autoreg and Long-range) or in the "hierarchical" family (the remainder). Those in the hierarchical family achieve significantly better FVDs [23] on GQN-Mazes. The samples described further below suggest that this is related to the autoregressive methods "forgetting" the colors of walls after looking away from them for a short time. In contrast, for MineRL the autoregressive methods tend to achieve the best FVDs. This may relate to the fact that trajectories in MineRL tend to travel in straight lines through procedurally-generated "worlds" [5, 17], limiting the number of long-range dependencies. Finally on CARLA Town01 qualitatively different behaviors were noticed from the autoregressive and hierarchical sampling schemes. The hierarchical sampling schemes have a tendency to occasionally lose coherence and "jump" to different locations in the town. This is reflected by higher outlier percentages (OP) in Table 1. On the other hand the autoregressive schemes often stay stationary for unrealistically long times at traffic lights. This is reflected in the histogram of speeds in FIG. 5, graphing speed distributions measured from sampled and ground-truth dataset videos, which has a larger peak around zero than the ground truth. The high variance of the sampling scheme's relative performance over different datasets points to a strength of the example embodiment of the FDM, which need only be trained once and then used to explore a variety of sampling schemes. Furthermore, the best FVDs in Table 1 on all datasets were obtained using sampling schemes that could not be implemented using models trained in prior work, or over evenly spaced frames.

[8] models 64-frame videos using two trained DDPMs. The first is a "frameskip-4" model trained to generate every fourth frame and the second is a "frameskip-1" model trained on sequences of nine consecutive frames and used to "fill in" the gaps between frames generated in the first stage. To compare against this approach, denoted VDM, both a "frameskip-4" and a "frameskip-1" model with architectures identical to those of an example embodiment. Since VDM requires two trained DDPMs, it is trained for more GPU-hours than FDM despite the fact that FDM is meta-learning over a far broader task distribution. VDM is also compared against TATS [4], which embeds videos into a discrete latent space before modelling them with transformers, and the clockwork VAE (CWVAE) [17], a VAE-based model specifically designed to maintain long-range dependencies within video.

Both the diffusion-based methods, FDM and VDM, achieve significantly higher FVD scores than TATS and CWVAE. This may point toward the utility of diffusion models in general for modeling images and video. Table 1 also makes clear the main benefit of FDM over VDM: although there is no sampling scheme for FDM which always outperforms VDM, there is at least one sampling scheme that outperforms it on each dataset. This speaks to the utility of learning a flexible model like FDM that allows different sampling schemes to be experimented with after training.

As mentioned above in respect of training, another advantage of FDM is that it makes possible a model- and dataset-specific optimization procedure to determine on which frames to condition. Table 2 shows the results when this procedure is used to create sampling schemes for different datasets. In the first row are results where the latent frames are fixed to be those of the Autoreg sampling scheme, and in the second row the latent frames are fixed to match those of Hierarchy-2. On two of the three datasets the best results in Table 1 are improved upon, showing the utility of this optimization procedure. In Table 2, the FVD scores are for sampling schemes with observed indices optimized offline as described above in respect of training. An asterisk is used to mark the eight numbers that improve on the corresponding non-optimized sampling schemes and the bolded results are those that are better than any in Table 1.

TABLE 2

FVD Scores for Sampling Schemes with Optimized Observed Indices

| Sampling scheme | GQN-Mazes | | MineRL | CARLA Town01 | | |
| --- | --- | --- | --- | --- | --- | --- |
| | FVD | Accuracy | FVD | FVD | WD | OP |
| Opt. autoreg | 53.6 ± 1.2* | 80.2 ± 1.2* | 257 ± 6.8* | 146* | 0.452* | 0.65 |
| Opt. hierarchy-2 | 51.1 ± 1.3* | 84.6 ± 0.7* | 320 ± 7.0* | 124 | 0.349 | 4.11* |

Training a network with this distribution over training tasks could be expected to lead to worse performance on a single task than training specifically for that task. To test whether this is the case, an ablation of FDM is trained with training tasks exclusively of the type used in the Autoreg sampling scheme, i.e. "predict ten consecutive frames given the previous ten." Tested with the Autoreg sampling scheme, it obtained an FVD of 82.0 on GQN-Mazes and 234 on MineRL. As expected given the specialization to a single task, this is better than when FDM is run with the Autoreg sampling scheme (obtaining FVDs of 86.4 and 281 respectively).

To test how important the proposed structured training distribution is to FDM's performance, an ablation with a different task distribution is performed that samples X and $\mathcal{Y}$ from uniform distributions instead of the proposed structured task distribution This is discussed in further detail below; here, the conclusion is that switching away from the structured training distribution made the FVD scores worse on all five tested sampling schemes on both GQN-Mazes and MineRL. The reduction in the average FVD was 31% on GQN-Mazes and 52% on MineRL. This implies that the structured training distribution has a significant positive effect.

Discussion

The foregoing describes and empirically tests a new method for generating differently indexed data entries that are conditionally dependent on each other, such as photo-realistic videos, with long-range coherence that respects and efficiently uses fixed, finite computational resources. It outperforms prior work on long-duration video modeling as measured by quantitative and semantically meaningful metrics. Similar to using DDPMs for image generation, in at least some embodiments the method may be slow to sample from (e.g., it can take approximately 16 minutes to generate a 300 frame video on a GPU). Sampling may be made faster by decreasing the number of integration steps [16, 20, 27], for example.

In respect of the datasets used for training, in each there was a policy for generating the sequences of actions that causally led to the frame-to-frame changes in camera pose. In MineRL the video was generated by agents that were trained to explore novel Minecraft worlds to find a goal block approximately 64 meters away [5]. The CARLA data was produced by a camera attached to an agent driven by a low level proportional-integral-derivative controller following waypoints laid down by a high level planner that was given new, random location goals to drive to intermittently. In both cases the example embodiment of the model being trained had no access to either the policy or the specific actions taken by these agents and, so, in a formal sense, it integrated or marginalized over actions drawn from the stochastic policy used to generate the videos in the first place. In at least some other embodiments, other modalities (e.g. audio) may be added to FDM and/or actions and rewards may be explicitly added, transforming the video generative model into a vision-based world model in the reinforcement learning sense [9, 10]. Furthermore, FDM trained on CARLA Town01 is in theory capable of creating 100-second videos conditioned on both the first and final frame. Doing so can be interpreted as running a "visual" controller which proposes a path between a current state and a specified goal.

Experimental Details

The following are experimental details for all results reported above. The GPUs referenced are all either NVIDIA™ RTX A5000s or NVIDIA™ A100s. In rows where GPU-hours are given as a range, different runs with identical settings took varying times due to varying performance of the computational infrastructure.

TABLE 3

Experimental Details for All Reported Results

| Experiment | Method | Res. | Params (millions) | Batch size | GPUs | Iterations (thousands) | GPU-hours | K | Diffusion steps |
|---|---|---|---|---|---|---|---|---|---|
| GQN-Mazes | FDM | 64 | 78 | 8 | 1x A100 | 950 | 156 | 20 | 1000 |
| | VDM (frameskip-1/4) | 64 | 78/78 | 8/8 | 1x A100 | 1600/1100 | 151/153 (total 304) | N/A | 1000 |
| | TATS (VQGAN/Tran.) | 64 | 61/423 | 96/16 | 8/8x A100 | 72/1320 | 1314/1344 (total 2658) | N/A | N/A |
| | CWVAE | 64 | 34 | 50 | 1x A100 | 110 | 148 | N/A | N/A |
| MineRL | FDM | 64 | 78 | 8 | 1x A100 | 850 | 156 | 20 | 1000 |
| | VDM (frameskip-1/4) | 64 | 78/78 | 8/8 | 1x A100 | 1600/1100 | 161/163 (total 324) | N/A | 1000 |
| | TATS (VQGAN/Tran.) | 64 | 61/423 | 96/16 | 8/8x A100 | 72/550 | 1328/1056 (total 2384) | N/A | N/A |
| | CWVAE | 64 | 34 | 50 | 1x A100 | 60 | 41 | N/A | N/A |
| CARLA Town01 | FDM | 128 | 80 | 8 | 4x A100 | 500 | 380 | 20 | 1000 |
| | VDM (frameskip 1/4) | 128 | 80/80 | 4/4 | 2/4x A100 | 1750/1000 | 332/380 (total 712) | N/A | 1000 |
| | TATS (VQGAN/Tran.) | 128 | 61/423 | 48/8 | 4/4x A100 | 156/270 | 652/242 (total 894) | N/A | N/A |
| | CWVAE | 64 | 34 | 50 | 1x A100 | 70 | 115 | N/A | N/A |
| Ablations on GQN-Mazes | FDM (incl. ablations) | 64 | 78 | 3 | 1x A5000 | 500 | 40-70 | 10 | 250 |
| Ablations on MineRL | FDM (incl. ablations) | 64 | 78 | 3 | 1x A5000 | 500 | 40-70 | 10 | 250 |

Table 4 presents additional metrics for evaluation on video completion. Lower is better for the test "Loss" and LPIPS. Higher is better for SSIM and PSNR.

TABLE 4

Additional Metrics for Evaluation on Video Completion

| Model | Sampling scheme | GQN-Mazes | | | | MineRL | | | | CARLA Town01 | | |
|---|---|---|---|---|---|---|---|---|---|---|---|---|
| | | Loss | LPIPS | SSIM | PSNR | Loss | LPIPS | SSIM | PSNR | LPIPS | SSIM | PSNR |
| CWVAE [17] | CWVAE | — | 0.41 | 0.64 | 16.3 | — | 0.50 | 0.59 | 19.3 | 0.53 | 0.71 | 15.5 |
| TATS [4] | TATS | — | 0.40 | 0.59 | 15.5 | — | 0.42 | 0.45 | 17.0 | 0.40 | 0.68 | 13.9 |
| VDM [8] | VDM | 6.04 | 0.39 | 0.61 | 16.1 | 8.48 | 0.33 | 0.54 | 19.2 | 0.35 | 0.71 | 15.4 |
| FDM | Autoreg | 6.41 | 0.40 | 0.60 | 15.5 | 9.80 | 0.32 | 0.53 | 18.9 | 0.28 | 0.74 | 17.5 |
| | Long-range | 6.41 | 0.37 | 0.61 | 16.3 | 9.79 | 0.32 | 0.54 | 19.0 | 0.26 | 0.75 | 18.5 |
| | Hierarchy-2 | 6.40 | 0.37 | 0.61 | 16.4 | 9.75 | 0.33 | 0.54 | 19.0 | 0.29 | 0.73 | 17.2 |
| | Hierarchy-3 | 6.38 | 0.38 | 0.62 | 16.4 | 9.54 | 0.33 | 0.54 | 19.1 | 0.31 | 0.72 | 16.9 |
| | Ad. hierarchy-2 | 6.40 | 0.37 | 0.62 | 16.4 | 9.80 | 0.33 | 0.53 | 19.0 | 0.30 | 0.72 | 17.0 |

The total compute required for this project, including all training, evaluation, and preliminary runs, was roughly 3.5 GPU-years. A mixture of NVIDIA™ RTX A5000s (on an internal cluster) and NVIDIA™ A100s (from a cloud provider) were used.

Due to the expensive nature of drawing samples from both FDM and baselines, all quantitative metrics reported over the first 100 videos of the test set for GQN-Mazes and MineRL were computed. For CARLA Town01, the test set length is 100. Table 3 lists the hyperparameters for all training runs reported. Additional details on the implementations of each method below.

The implementation of FDM builds on the DDPM implementation of [11]. For experiments at 64×64 resolution, the hyperparameters of the example embodiment architecture are almost identical to that of their 64×64 image generation experiments: for example, the example embodiment uses 128 as the base number of channels, the same channel multipliers at each resolution, and 4-headed attention. The exception is that the number of res-net blocks is decreased from 2 to 1 at each up/down-sampling step. As mentioned above, all layers from the image DDPM are run independently and in parallel for each frame, and a temporal attention layer is added after every spatial attention layer. The temporal attention layer has the same hyperparameters as the spatial attention layer (e.g. 4 attention heads) except for the addition of relative position encodings, described below. For experiments at 128×128 resolution, a similar architecture is used but with an extra block at 128×128 resolution with channel multiplier 1.

As mentioned above, VDM was trained by simply training two networks, each with architecture identical to that of FDM but different training tasks. In each of VDM's training tasks, a slice of 16 or 9 frames (with frameskip 4 or 1 respectively) is used. Zero or more "groups" of regularly-spaced frames are randomly sampled to observe (where groups of frames are sampled similarly here to in FDM's structured mask distribution in Algorithm 3), and the rest are latent. On all datasets, each of the two networks forming the VDM baseline is trained with roughly as many GPU-hours as FDM, so that VDM receives roughly twice as much training compute in total.

TATS was trained using its official implementation along with its suggested hyperparameters. For GQN-Mazes and MineRL, each stage is trained for close to a week and, following [4], on 8 GPUs in parallel. For all datasets, the total training computation is multiple times that of FDM. In the included video samples from the TATS baseline, some artifacts are clearly visible. It may be that these could be removed with further hyperparameter tuning, but this was not pursued. Notably, the datasets that were experimented on generally have a lower frame-rate than those used by [4], meaning that neighboring frames are more different and so potentially harder to model.

CWVAE was trained using its official implementation and hyperparameters as close as possible to those used in the implementation by [17] are used. 600 epochs were used to train CWVAE on MineRL, as suggested by [17], and it was trained for more iterations on both other datasets. On CARLA Town01, since CWVAE is not implemented for 128×128 images, all train and test data were downsampled to 64×64. Additional evaluation metrics are reported in Table 4. The "Loss" refers to the average DDPM loss (Equation (4)) over the test set, such that an appropriate choice of $\lambda(t)$ would yield the ELBO of the test videos under each model and sampling scheme although, as in the training loss, $\lambda(t):=1$ to de-emphasise pixel-level detail. The commonly-used [17, 1] LPIPS, SSIM and PSNR metrics measure frame-wise distances between each generated frame around the ground-truth. To account for stochasticity in the task, k video completions are generated for each test video and the smallest distance to the ground-truth is reported. They are reported for completeness, SSIM and PSNR do not appear to correlate well with video quality due to the stochastic nature of our datasets. Since SSIM and PSNR are related to the mean-squared error in pixel space, they favor blurry samples over more realistic samples. While increasing k should counteract this effect, the effectiveness of this scales poorly with video length and so this made little difference in the datasets considered herein.

It is mentioned above that an ablation is performed on the training task distribution. FVD scores from this ablation are reported in Table 5. Sampling is from the baseline "uniform" task distribution as follows (where Uniform(a, b) should be understood to assign probability to all integers between a and b inclusive):

1. Sample $n_{total}$~Uniform (1, K).
2. Assign $Z$ to be a vector of $n_{total}$ integers sampled without replacement from $\{1, \ldots, K\}$.
3. Sample $n_{obs}$~Uniform (0, $n_{total}$−1).

4. Assign the first $n_{obs}$ entries in $\mathcal{Z}$ to $\mathcal{Y}$ and the remainder to X.

This leads to a much less structured distribution than that described in respect of FIG. 4. The network trained using this proposed task distribution obtains a better FVD than the ablation on all tested combinations of dataset and sampling scheme. Note that all networks in this experiment use the hyperparameters reported in the bottom two rows of Table 3, explaining the disparity between FVDs here and in Table 1.

TABLE 5

Ablation for training task distribution

|  |  | FDM | Uniform |
|---|---|---|---|
| GQN-Mazes | Autoreg | 245 | 327 |
|  | Hierarchy-2 | 235 | 279 |
|  | Long-range | 198 | 281 |
|  | Hierarchy-3 | 176 | 284 |
|  | Ad. hierarchy-2 | 178 | 281 |
|  | Average | 226 | 296 |
| MineRL | Autoreg | 465 | 672 |
|  | Hierarchy-2 | 586 | 902 |
|  | Long-range | 504 | 783 |
|  | Hierarchy-3 | 515 | 970 |
|  | Ad. hierarchy-2 | 613 | 990 |
|  | Average | 518 | 786 |

Relative Position Encodings

The temporal attention layer is run independently at every spatial location, allowing each spatial location in every frame to attend to its counterparts at the same spatial location in every other frame. That is, denoting the input to a temporal attention layer $z^{in}$ and the output $z^{out}$, the K×C slice $z_{:,h,w,:}^{out}=\text{attn}(z_{:,h,w,:}^{in})$ is computed for every spatial position (h, w). To condition the temporal attention on the frame's positions within the video, relative position encodings (RPEs) [18, 26] are used for each pair of frames. Let $pos(i)=(X\oplus\mathcal{Y})_i$ be a function mapping the index of a frame within z to its index within the full video v. Then the encoding of the relative position of frames i and j depends only on $pos(i)-pos(j)$. This RPE is written as the set of three vectors $p_{ij}=\{p_{ij}^Q,p_{ij}^K,p_{ij}^V\}$, which are used in a modified form of dot-product attention (described in the following paragraph). Since $p_{ij}$ must be created for every (i, j) pair in a sequence, computing it adds a cost which scales as $O(K^2)$ and prior work has attempted to minimize this cost by parametrizing $p_{ij}$ with a simple learned look-up table (LUT) as $p_{ij}:=\text{LUT}(pos(i)-pos(j))$. In the next paragraph an alternative to the LUT is described, but first consider how the RPEs are used in either case. The RPEs are used in the same way as [18]. As in a standard transformer [24], a sequence of input vectors $z_1^{in},\ldots,z_K^{in}$ are transformed to queries, keys, and values via the linear projections $q_i=W^Q z_i$, $k_i=W^K z_i$, and $v_i=W^V z_i$ for $i=1,\ldots,K$. Given the RPEs for all (i, j) pairs, and marking the operations involving them in blue, the output of the attention block is $$z_i^{out} = z_i^{in} + \sum_{j=1}^{K} \alpha_{ij}(v_j blue + p_{ij}^V) \text{ where } \alpha_{ij} = \frac{\exp(e_{ij})}{\sum_{k=1}^{K}\exp(e_{ik})} \text{ with} \quad (5)$$

$$e_{ij} = \frac{1}{\sqrt{d_z}}(q_i^T k_j blue + p_{ij}^{Q^T} k_j + q_i^T p_{ij}^K).$$

Figure 6:
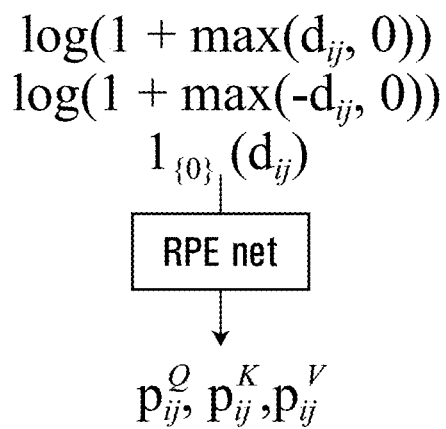
FIG. 6 depicts parameterization of relative position encodings, according to an example embodiment.

The simplicity of parametrizing RPEs with a LUT is not necessary within the example framework described herein for three reasons. (1) In this framework, K can be kept small, so the $O(K^2)$ scaling cost is of limited concern. (2) Furthermore, since the temporal attention mechanism is run for all spatial locations (h, w) in parallel, the cost of computing RPEs can be shared between them. (3) The range of values that $pos(i)-pos(j)$ can take scales with the video length N, and the average number of times that each value is seen during training scales as $K^2/N$. For long videos and small K, a look-up table will be both parameter-intensive and receive a sparse learning signal. One option is to parameterize $p_{ij}$ with a learned function as $p_{ij}:=f_{RPE}(d_{ij})$ where $d_{ij}:=pos(i)-pos(j)$. As shown in FIG. 6, which depicts parameterization of $f_{RPE}$ with $d_{ij}:=pos(i)-pos(j)$, $f_{RPE}$ passes a 3-dimensional embedding of $d_{ij}$ through a neural network which outputs the vectors making up $p_{ij}$. A network with a single C-channel hidden layer is used and no difference in the runtime between a DDPM with this network and a DDPM with a look-up table was measurable. FIG. 7 shows the effect of the RPE network on attention weights early in training. Architectures with an RPE network can learn the relative importance of other frames much more quickly. After training to convergence, there was no noticeable difference in sample quality but the architecture with an RPE network used 9.8 million fewer parameters by avoiding storing large look-up tables.

More particularly, FIG. 7 shows temporal attention weights averaged over attention heads, spatial locations, network layers, and diffusion timesteps 1000 to 751. The color of entry r, c is the average weight with which the rth frame in x⊕y attends to the cth frame. Black means zero weight. An example where $\mathcal{Y}=\{0, 50, \ldots, 250\}$ and X={300, 350, . . . , 950} is plotted. These plots are made with a network 50 000 iterations through training on the CARLA Town01 dataset. The left side of FIG. 7 is from an architecture with an RPE network. The right side of FIG. 7 is from a network with look-up tables of relative position embeddings. The architecture with an RPE network in the left plot has already learned to assign much greater weight to the nearest frames, while e.g. latent frames attend almost uniformly to other latent frames in the right plot. After training to convergence, both plots look similar to that on the left.

An alternative approach to the RPE network described by [26] shares the look-up table entries among "buckets" of similar $pos(i)-pos(j)$, but this imposes additional hyperparameters as well as restricting network expressivity.

Explanation of Training Task Distribution

Here additional discussion is provided on the motivation, design choices and more explanation of the training task distribution, as visualized in FIG. 4 and implemented in Algorithm 3. Since the model is trained to work with any custom sampling scheme at test time, the training distribution should be broad enough to assign some probability to any feasible choices of frames to sample and observe. At the same time, it is desirable to avoid purely random sampling of frame positions (as in e.g. the ablation described above) as this will impair performance in realistic sampling schemes. Taking these considerations in mind, the design considerations for Algorithm 3 are:

1. The model should sample frames at multiple timescales, so the spacing between frames is sampled (as on line 4 of Algorithm 3). A log-uniform distribution is a natural fit since events in a video sequence can happen over timescales in, e.g., seconds, minutes, or hours, and the differences between these are best captured by a log scale. The parameters of this log-uniform distribution are chosen to be the broadest possible (given the video length and the frame rate).
2. The user may wish to jointly sample multiple disparate sections of a video. Therefore it is possible to sample multiple groups of frames, potentially with different timescales (this is the purpose of the while loop in Algorithm 3).
3. The number of frames a user may wish to sample at a time is not fixed, so a broad uniform distribution is added over this (line 3 of Algorithm 3).
4. The model is trained to perform conditional generation, so groups of frames to be conditioned are chosen (line 6 of Algorithm 3) using the simplest appropriate distribution, Bernoulli (0.5).

The remainder of the algorithm comprises gathering the indexed frames (lines 1, 7, 9-13), randomizing the position of frames within the video (line 5) and enforcing that the number of frames does not exceed K (line 8).

Sampling Schemes

FIGS. 8A-8H illustrate each of the sampling schemes for which results are reported above. The versions shown are adapted to completing 300-frame GQN-Mazes videos from 36initial observations, but all can be extended to e.g. different video lengths.

As mentioned in the main text, the Ad. hierarchy-2 sampling scheme chooses which frames to condition on at test-time by selecting a diverse set of observed of previously generated frames. The procedure to generate this set is as follows. For a given stage s $X_s$ is defined to be the same as the latent frame indices at the corresponding stage of the standard Hierarchy-2 sampling scheme. $\mathcal{Y}_s$ is then initialized with the closest observed or previously generated frame before the first index in $X_s$, after the last index in $X_s$, and any observed or previously generated frames between the first and last indices of $X_s$. More observed indices are then added to $\mathcal{Y}_s$ in an iterative procedure, greedily adding the observed or previously generated frame with the maximum LPIPS [28] distance to its nearest neighbor in $\mathcal{Y}_s$. Frames are added one-at-a-time in this way until $\mathcal{Y}_s$ is the desired length (generally K/2, or 10 in our experiments). Despite using a convolutional neural network to compute the LPIPS distances, the computational cost of computing $\mathcal{Y}_s$ in the experiments with Ad. hierarchy-2 is small relative to the cost of drawing samples from the DDPM.

The procedure for optimizing the choice of indices to condition on at each stage in a sampling scheme is now described. The procedure requires that the "latent" frames are pre-specified. FIGS. 8F and 8G show examples of the indices that the optimization scheme chooses to condition on for GQN-Mazes when the latent indices are set according to either the Autoreg or Hierarchy-2 sampling scheme. The (relatively computationally-expensive) optimization described now need only be performed once and then arbitrarily many videos can be sampled. This is in contrast to the adaptive sampling scheme described in the preceding paragraph, in which the sets of indices to condition on are chosen afresh (with small computational cost) for each video as it is sampled. For each stage of the sampling scheme, the set of indices to condition on is selected with a greedy sequential procedure.

This procedure begins by initializing this set of indices, $\mathcal{Y}$. In general $\mathcal{Y}$ can be initialized as an empty set, but it can also be initialized with indices that the algorithm is "forced" to condition on. It is initialized to contain the closest observed/previously sampled indices before and after each latent index. In other words, it is initialized so that there are pixels 204 between any pixels 202,206 in each row of FIGS. 8F and 8G.

On each iteration of the procedure, the DDPM loss is estimated in Equation (4) (with uniform weighting) for every possible next choice of index to condition on. That is, the DDPM loss is computed when conditioning on frames at indices $\mathcal{Y} \oplus [i]$ for every $i \in \{1, \ldots, N\} \backslash X \backslash \mathcal{Y}$. The loss is estimated by iterating over timesteps $t \in \{100, 200, \ldots, 1000\}$ and, for each timestep, estimating the expectation over $x_0$ with 10 different training images. It was found that the iteration over a grid of timesteps, rather than random sampling, helped to reduce the variance in the loss estimates. The index resulting in the lowest loss was then selected, appended to $\mathcal{Y}$, and this is repeated until $\mathcal{Y}$ is at the desired length. The entire procedure is repeated for every stage of the sampling scheme.

CARLA Town01 Dataset

The CARLA Town01 dataset was created by recording a simulated car driving programmatically around the CARLA simulator's Town01 [2]. The car is driven so as to stay close to the speed limit of roughly 3 m/s where possible, stopping at traffic lights. The simulations ran for 10,000 frames and were split each into 10 1000-frame videos (due to technical glitches, not all simulations finished; when that occurred, however many 1000-frame videos that had been generated were saved). Within each simulation, the weather and other world state (e.g. state of the traffic lights) is sampled randomly. The car begins each simulation in a random position, and navigates to randomly selected waypoints around the town. As soon as it reaches one, another is randomly sampled so that it continues moving. A 120 degree field of view is used and frames are rendered at 128×128 resolution. To perform evaluations on this dataset, a regressor is trained to map from a frame (either from the dataset or from a video model) to the corresponding town coordinates. This is trained with (x,y) coordinates extracted from the simulator corresponding to the car location at each frame. The regressor takes the form of two separate networks: a classifier mapping each frame to a cell within a 10×10 grid placed over the town; and a multi-headed regressor mapping from the frame to (x,y) coordinates in a continuous space. The final layer of the multi-headed regressor comprises 100 linear "heads", and which one to use for each data point is chosen depending on which cell the coordinate lies in. These two networks are trained separately but used jointly during evaluation, when the classifier is run first and its output determines which regressor head is used to obtain the final (x,y) coordinate. It was found that this approach improved the test mean-squared error considerably relative to using a single-headed regressor. The classifier was trained with data augmentation in the form of color jitter and a Gaussian blur, but it was found that the multi-headed regressor did not benefit from this data augmentation so trained it without. Both the classifier and multi-headed regressor had the Resnet128 [6] architecture, with weights pretrained on ImageNet, available for download from the PyTorch torchvision package [12].

Example Sampled Videos

To summarize the long video samples in this disclosure, FIG. 9 visualizes the trajectories taken throughout the (30-

40 minute) course on CARLA Town01. More particularly, FIGS. 9A-9C depict heat maps of locations visited in the CARLA Town01 training data (FIG. 9A), a long video sampled with Hierarchy-2 (FIG. 9B), and a long video sampled with Autoreg (FIG. 9C). The shade of the greyscale in the legend corresponds to the percentage of time spent in a given location and dots 902 mark the locations of traffic lights. Both sampled videos stop in locations in which the vehicle also stopped in the training data (shown as darker areas 904 on the heat map), corresponding to traffic light positions. The training data contains several days of video, so covers the map well. Each sampled trajectory lasts for 30-40 minutes so should not be expected to explore the entire map. However, Hierarchy-2 in particular obtains high coverage. The video sampled with Autoreg explores less of the map due to its tendency to remain stationary for long periods.

Figure 10:
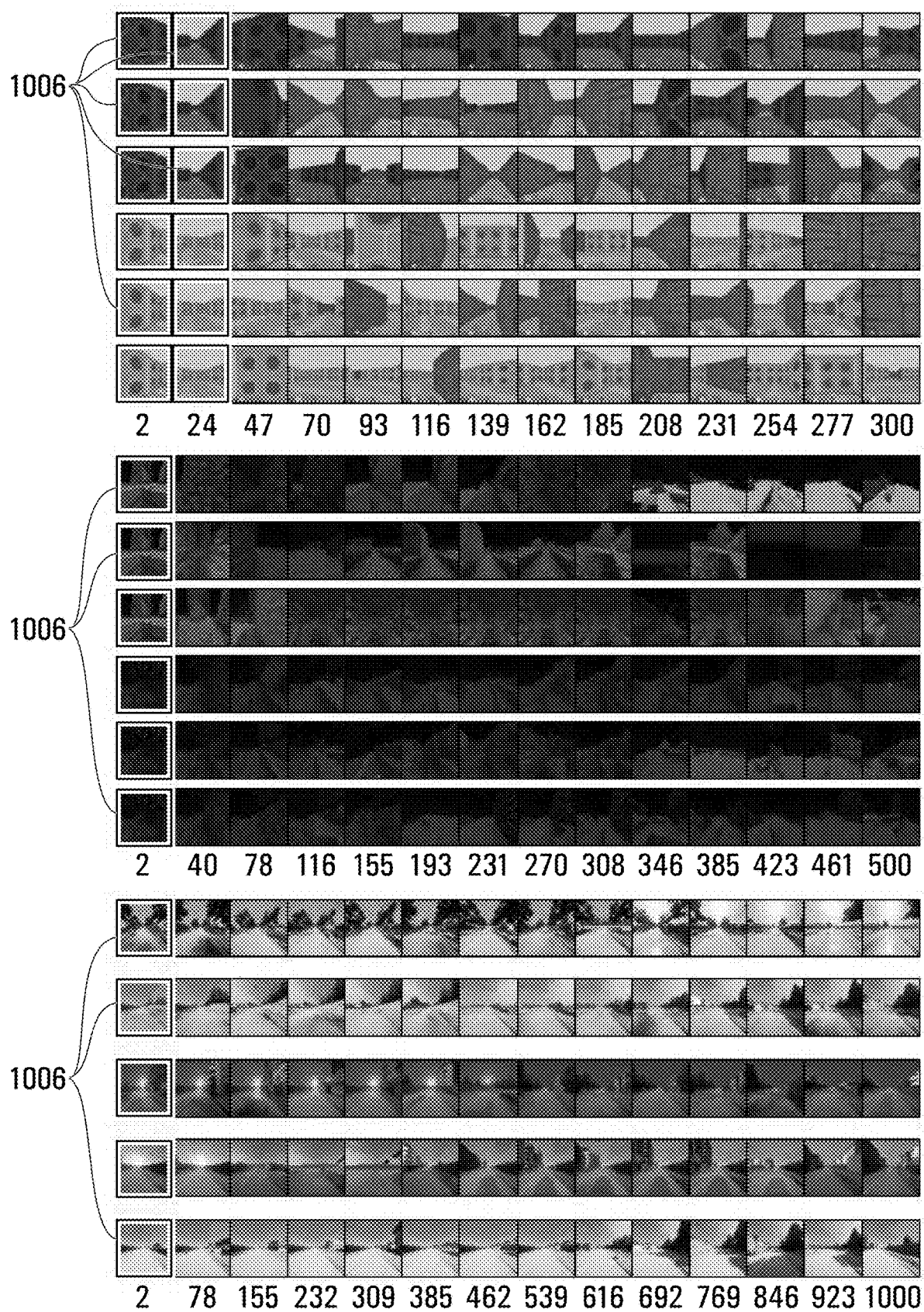
FIGS. 10-12 depict frames from video completions and unconditional video generations on various datasets, according to example embodiments.
Figure 11:
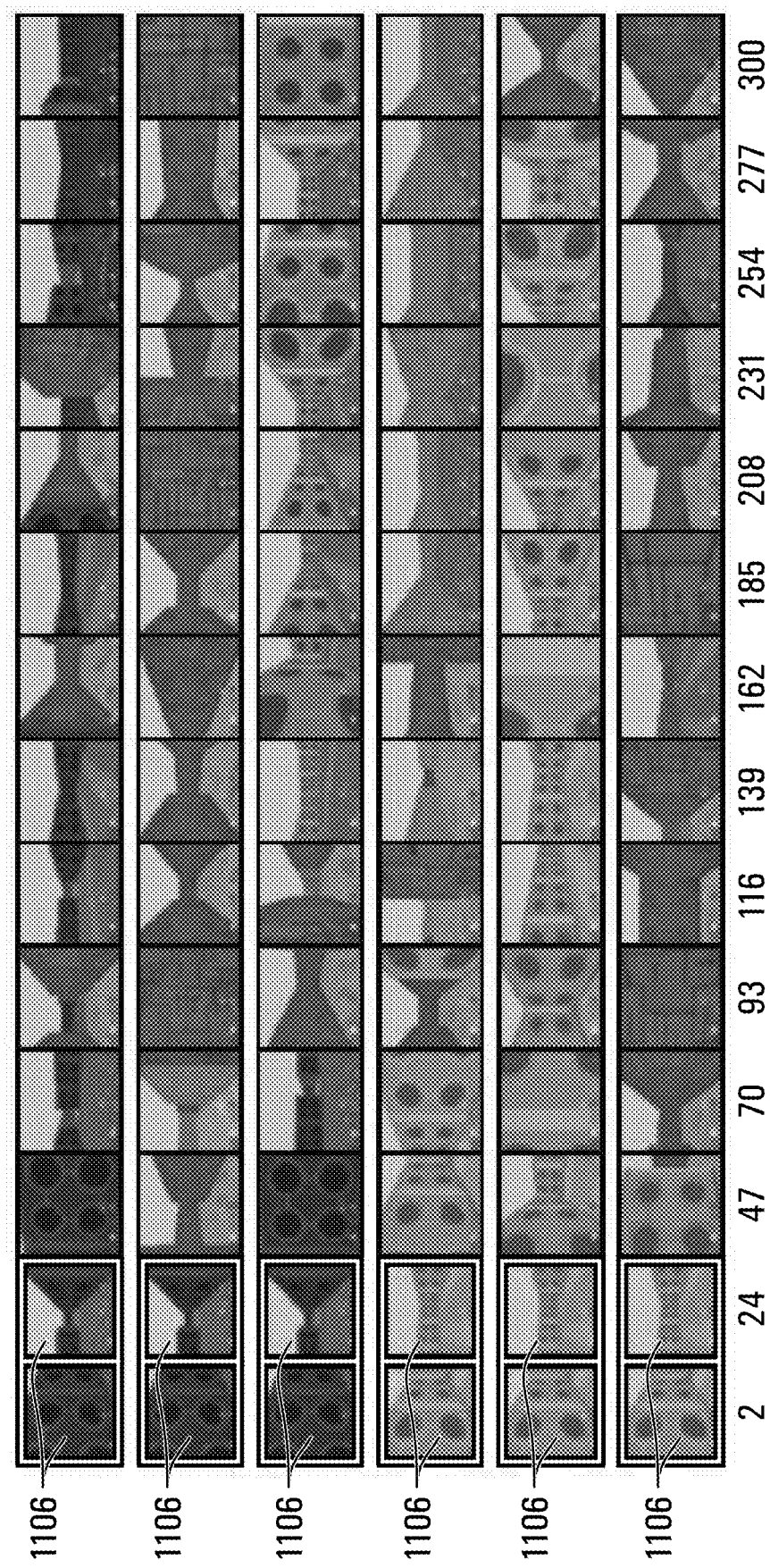
Figure 12:
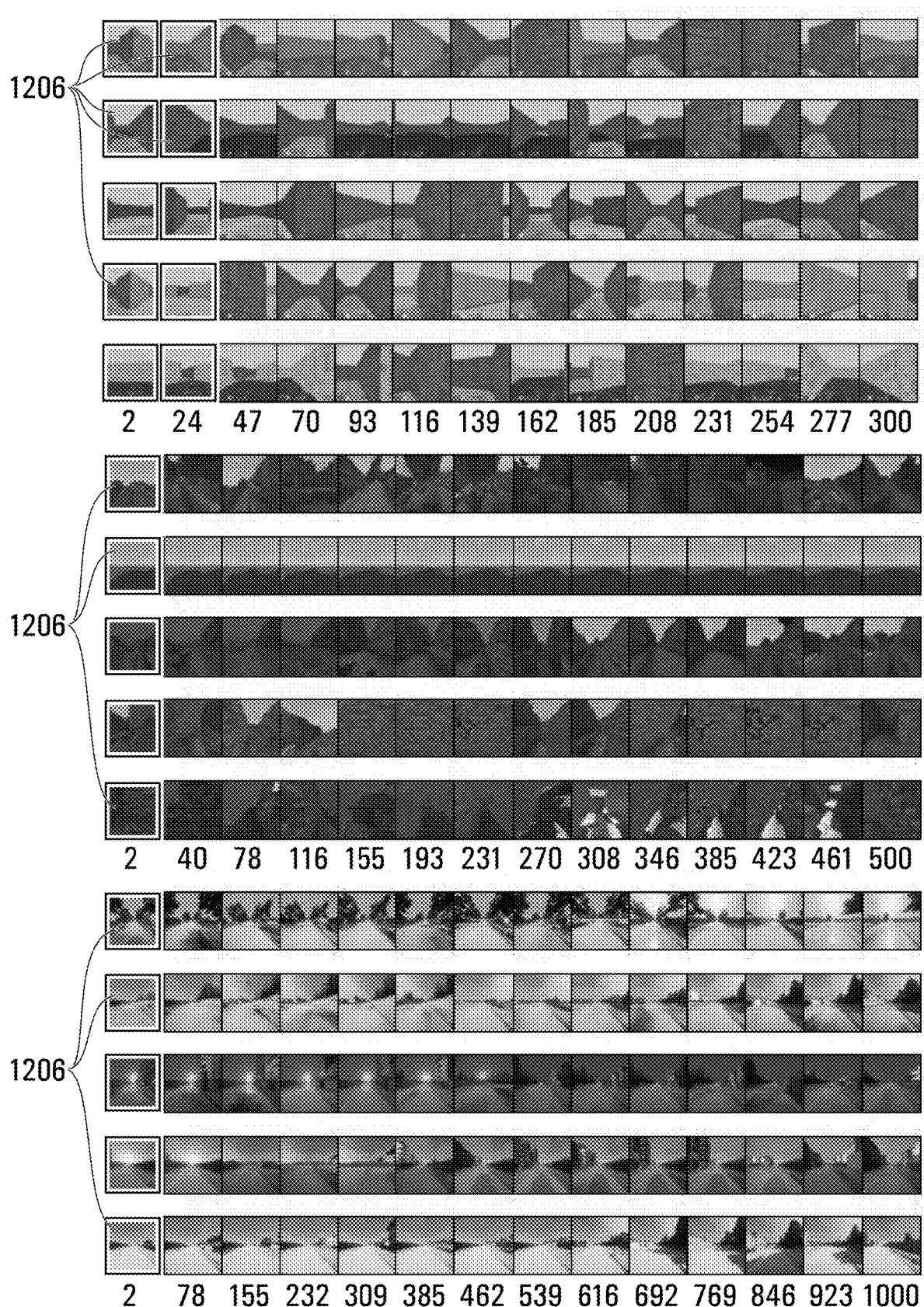

Additionally, FIGS. 10-12 show frames from uncurated samples of both video completions and unconditional video generations on each dataset. More particularly:

(a) FIG. 10 shows GQN-Mazes, MineRL, and CARLA Town01 completions sampled with Hierarchy-2. The first 36 frames are observed, labeled as 1106. Notably, the samples on GQN-Mazes do not exhibit the failure mode seen in FIG. 11.

(b) FIG. 11 shows GQN-Mazes completions sampled with Autoreg. There should only be two wall/floor colors within each video, but Autoreg often samples more as it cannot track long-range dependencies. This issue is not seen in the Hierarchy-2 samples shown in FIG. 10. Observed frames are labeled 1106.

(c) FIG. 12 shows videos sampled unconditionally by FDM with Hierarchy-2 on each dataset. Observed frames are labeled 1206.

Figure 13:
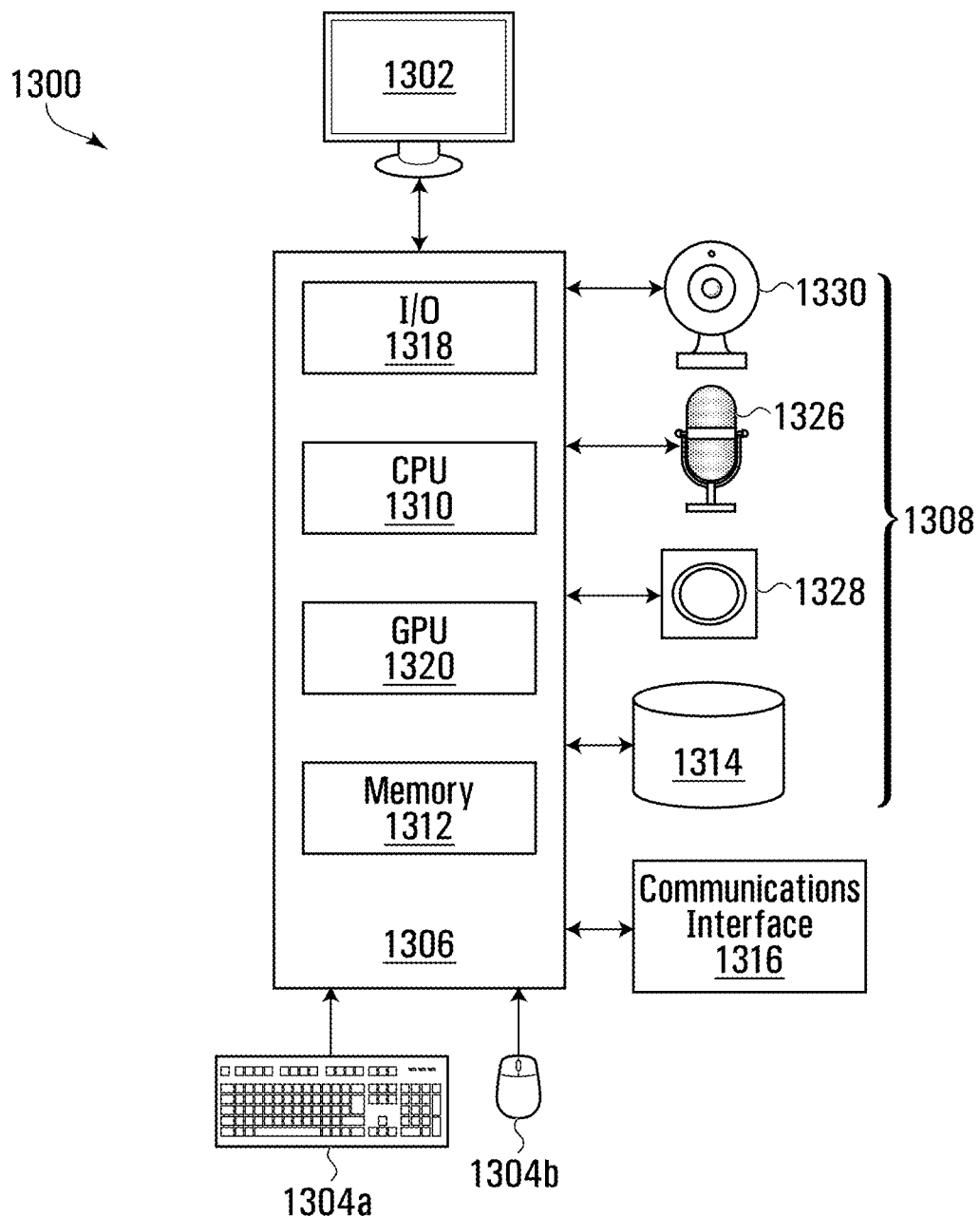
FIG. 13 depicts a computer system that may be used to implement a method for generating one or more conditionally dependent data entries, according to an example embodiment.

An example computer system in respect of which the FDM described above may be implemented is presented as a block diagram in FIG. 13. The example computer system is denoted generally by reference numeral 1300 and includes a display 1302, input devices in the form of keyboard 1304*a* and pointing device 1304*b*, computer 1306 and external devices 1308. While pointing device 1304*b* is depicted as a mouse, it will be appreciated that other types of pointing device, or a touch screen, may also be used.

The computer 1306 may contain one or more processors or microprocessors, such as a central processing unit (CPU) 1310. The CPU 1310 performs arithmetic calculations and control functions to execute software stored in a non-transitory internal memory 1312, preferably random access memory (RAM) and/or read only memory (ROM), and possibly storage 1314. The storage 1314 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This storage 1314 may be physically internal to the computer 1306, or external as shown in FIG. 13, or both. The storage 1314 may also comprise a database for storing training data as described above, or that may be used for storing the data that is conditionally or unconditionally generated at test-time. For example, the datasets used in the experiments described above may be stored in such a database and retrieved for use in training.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal memory 1312 and/or storage 1314 for execution by the one or more processors or microprocessors to effect neural network pre-training, training, or use of a trained network for inference.

The computer system 1300 may also include other similar means for allowing computer programs or other instructions to be loaded. Such means can include, for example, a communications interface 1316 which allows software and data to be transferred between the computer system 1300 and external systems and networks. Examples of communications interface 1316 can include a modem, a network interface such as an Ethernet card, a wireless communication interface, or a serial or parallel communications port. Software and data transferred via communications interface 1316 are in the form of signals which can be electronic, acoustic, electromagnetic, optical or other signals capable of being received by communications interface 1316. Multiple interfaces, of course, can be provided on a single computer system 1300.

Input and output to and from the computer 1306 is administered by the input/output (I/O) interface 1318. This I/O interface 1318 administers control of the display 1302, keyboard 1304*a*, external devices 1308 and other such components of the computer system 1300. The computer 1306 also includes a graphical processing unit (GPU) 1320. The latter may also be used for computational purposes as an adjunct to, or instead of, the CPU 1310, for mathematical calculations.

The external devices 1308 include a microphone 1326, a speaker 1328 and a camera 1330. Although shown as external devices, they may alternatively be built in as part of the hardware of the computer system 1300. For example, the camera 1330 and microphone 1326 may be used to retrieve multi-modal content for use in training or at inference/test-time.

The various components of the computer system 1300 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification, so long as such implementation or combination is not performed using mutually exclusive parts.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

REFERENCES

[1] Mohammad Babaeizadeh, Mohammad Taghi Saffar, Suraj Nair, Sergey Levine, Chelsea Finn, and Dumitru Erhan. Fitvid: Overfitting in pixel-level video prediction. *arXiv preprint arXiv:* 2106.13195, 2021.

[2] Alexey Dosovitskiy, German Ros, Felipe Codevilla, Antonio Lopez, and Vladlen Koltun. Carla: An open urban driving simulator. In *Conference on robot learning*, pages 1-16. PMLR, 2017.

[3] SM Ali Eslami, Danilo Jimenez Rezende, Frederic Besse, Fabio Viola, Ari S Morcos, Marta Garnelo, Avraham Ruderman, Andrei A Rusu, Ivo Danihelka, Karol Gregor, et al. Neural scene representation and rendering. *Science,* 360(6394):1204-1210, 2018.

[4] Songwei Ge, Thomas Hayes, Harry Yang, Xi Yin, Guan Pang, David Jacobs, Jia-Bin Huang, and Devi Parikh. Long video generation with time-agnostic vqgan and time-sensitive transformer. *arXiv preprint arXiv:*2204.03638, 2022.

[5] William H Guss, Brandon Houghton, Nicholay Topin, Phillip Wang, Cayden Codel, Manuela Veloso, and Ruslan Salakhutdinov. Minerl: A large-scale dataset of minecraft demonstrations. *arXiv preprint arXiv:* 1907.13440, 2019.

[6] Kaiming He, Xiangyu Zhang, Shaoqing Ren, and Jian Sun. Deep residual learning for image recognition. arxiv 2015. *arXiv preprint arXiv:*1512.03385, 2015.

[7] Jonathan Ho, Ajay Jain, and Pieter Abbeel. Denoising diffusion probabilistic models. *Advances in Neural Information Processing Systems,* 33:6840-6851, 2020.

[8] Jonathan Ho, Tim Salimans, Alexey Gritsenko, William Chan, Mohammad Norouzi, and David J Fleet. Video diffusion models. *arXiv preprint arXiv:* 2204.03458, 2022.

[9] Maximilian Igl, Luisa Zintgraf, Tuan Anh Le, Frank Wood, and Shimon Whiteson. Deep variational reinforcement learning for pomdps. In *International Conference on Machine Learning*, pages 2117-2126. PMLR, 2018.

[10] Lukasz Kaiser, Mohammad Babaeizadeh, Piotr Milos, Blazej Osinski, Roy H Campbell, Konrad Czechowski, Dumitru Erhan, Chelsea Finn, Piotr Kozakowski, Sergey Levine, et al. Model-based reinforcement learning for atari. *arXiv preprint arXiv:* 1903.00374, 2019.

[11] Alexander Quinn Nichol and Prafulla Dhariwal. Improved denoising diffusion probabilistic models. In *International Conference on Machine Learning*, pages 8162-8171. PMLR, 2021.

[12] Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. In *NIPS-W,* 2017.

[13] Aditya Ramesh, Prafulla Dhariwal, Alex Nichol, Casey Chu, and Mark Chen. Hierarchical text-conditional image generation with clip latents. *arXiv preprint arXiv:*2204.06125, 2022.

[14] Olaf Ronneberger, Philipp Fischer, and Thomas Brox. U-net: Convolutional networks for biomedical image segmentation. In *International Conference on Medical image computing and computer-assisted intervention*, pages 234-241. Springer, 2015.

[15] Ludan Ruan, yiyang Ma, Huan Yang, Huiguo He, Bei Liu, Jianlong Fu, Nicholas Jing Yuan, Qin Jin, and Baining Guo. Mm-diffusion: Learning multi-modal diffusion models for joint audio and video generation. *arXiv preprint arXiv:*2212.09478, 2022.

[16] Tim Salimans and Jonathan Ho. Progressive distillation for fast sampling of diffusion models. *arXiv preprint arXiv:*2202.00512, 2022.

[17] Vaibhav Saxena, Jimmy Ba, and Danijar Hafner. Clockwork variational autoencoders. *Advances in Neural Information Processing Systems*, 34, 2021.

[18] Peter Shaw, Jakob Uszkoreit, and Ashish Vaswani. Self-attention with relative position representations. *arXiv preprint arXiv:*1803.02155, 2018.

[19] Jascha Sohl-Dickstein, Eric Weiss, Niru Maheswaranathan, and Surya Ganguli. Deep unsupervised learning using nonequilibrium thermodynamics. In *International Conference on Machine Learning*, pages 2256-2265. PMLR, 2015.

[20] Jiaming Song, Chenlin Meng, and Stefano Ermon. Denoising diffusion implicit models. *arXiv preprint arXiv:*2010.02502, 2020.

[21] Yang Song, Jascha Sohl-Dickstein, Diederik P Kingma, Abhishek Kumar, Stefano Ermon, and Ben Poole. Score-based generative modeling through stochastic differential equations. *arXiv preprint arXiv:* 2011.13456, 2020.

[22] Yusuke Tashiro, Jiaming Song, Yang Song, and Stefano Ermon. Csdi: Conditional score-based diffusion models for probabilistic time series imputation. *Advances in Neural Information Processing Systems*, 34, 2021.

[23] Thomas Unterthiner, Sjoerd van Steenkiste, Karol Kurach, Raphael Marinier, Marcin Michalski, and Sylvain Gelly. Towards accurate generative models of video: A new metric & challenges. *arXiv preprint arXiv:*1812.01717, 2018.

[24] Ashish Vaswani, Noam Shazeer, Niki Parmar, Jakob Uszkoreit, Llion Jones, Aidan N Gomez, Łukasz Kaiser, and Illia Polosukhin. Attention is all you need. *Advances in neural information processing systems*, 30, 2017.

[25] Christian Weilbach, William Harvey, and Frank Wood. Graphically structured diffusion models. *arXiv preprint arXiv:*2210.11633, 2022.

[26] Kan Wu, Houwen Peng, Minghao Chen, Jianlong Fu, and Hongyang Chao. Rethinking and improving relative position encoding for vision transformer. In *Proceedings of the IEEE/CVF International Conference on Computer Vision*, pages 10033-10041, 2021.

[27] Zhisheng Xiao, Karsten Kreis, and Arash Vahdat. Tackling the generative learning trilemma with denoising diffusion GANs. In *International Conference on Learning Representations*, 2022.

[28] Richard Zhang, Phillip Isola, Alexei A Efros, Eli Shechtman, and Oliver Wang. The unreasonable effectiveness of deep features as a perceptual metric. In *Proceedings of the IEEE conference on computer vision and pattern recognition*, pages 586-595, 2018.

The invention claimed is:

1. A method comprising generating data using a probabilistic generative model, wherein the probabilistic generative model is trained using a plurality of different data generation tasks respectively corresponding to a plurality of vectors each comprising a sequence of differently indexed data entries that are conditionally dependent on each other, wherein each of the data generation tasks comprises generating at least one latent data entry selected from the sequence of data entries in response to being provided at least one index for each of the at least one latent data entry, and wherein during training each of the at least one latent data entry that is generated is evaluated against an actual value of the at least one latent data entry.

2. The method of claim 1, wherein the probabilistic generative model comprises a score based diffusion model.

3. The method of claim 2, wherein the score based diffusion model comprises a denoising diffusion probabilistic model (DDPM).

4. The method of claim 1, wherein the differently indexed data entries are indexed at least by time.

5. The method of claim 1, wherein the probabilistic generative model comprises at least one attention layer, wherein each of the at least one attention layer relates different ones of the differently indexed data entries according to indices or modalities of the differently indexed data entries.

6. The method of claim 5, wherein the sequence of data entries comprises different frames of a video, wherein the at least one attention layer comprises at least one spatial attention layer and at least one temporal attention layer, wherein the at least one spatial attention layer relates different ones of the frames to each other spatially, and wherein the at least one temporal layer relates different ones of the frames to each other temporally.

7. The method of claim 1, wherein relative position encodings are used to relate different ones of the differently indexed data entries to each other by respective indices of the differently indexed data entries.

8. The method of claim 7, wherein the sequence of data entries comprises different frames of a video, and wherein the relative position encodings are used to relate different ones of the frames to each other temporally in the at least one temporal layer.

9. The method of claim 1, wherein at least one of the data generation tasks is a conditional data generation task and comprises providing to the probabilistic generative model at least one observed data entry and at least one corresponding index selected from the sequence of data entries, and wherein generating the at least one latent data entry is conditioned on the at least one observed data entry and at least one corresponding index.

10. The method of claim 9, wherein the at least one corresponding index comprises a time index, and wherein the time index is later in time than a corresponding time index of the at least one latent data entry.

11. The method of claim 9, wherein the at least one observed data entry and the at least one latent data entry are of different modalities.

12. The method of claim 9, wherein for the at least one of the data generation tasks that is the conditional data generation task, at least one of the at least one latent data entry that is generated is non-consecutively indexed relative to each of the at least one observed data entry.

13. The method of claim 1, wherein for at least one of the different data generation tasks, the at least one latent data entry is unconditionally generated by requiring generating without inputting to the probabilistic generative model a particular one of the data entries on which to condition generation of the at least one latent data entry.

14. The method of claim 1, wherein for at least one of the different data generation tasks, the data is generated unconditionally by requiring generation without providing an input data sequence to the conditional density estimator on which to condition generation of the data.

15. The method of claim 1, wherein for at least one of the different data generation tasks, generating the data is performed conditionally and comprises:

providing to the probabilistic generative model an input data sequence comprising at least one data entry and at least one corresponding index of the same type as the at least one data entry and at least one corresponding index used to train the probabilistic generative model; and using the probabilistic generative model to generate at least one new sample data entry over multiple stages conditioned on the at least one data entry and at least one corresponding index provided to the probabilistic generative model.

16. The method of claim 15, wherein the conditional density estimator comprises a denoising diffusion probabilistic model (DDPM), the data entries of the input data sequence comprise different frames of a video segment, the sample data entries are sample frames and the data entries on which the sample frames are conditioned are conditional frames, and wherein following the multiple stages a consecutive series of the sample frames have been added to the video segment.

17. The method of claim 16, wherein one of the sample frames generated during one of the stages is used as one of the conditional frames during a subsequent one of the stages.

18. The method of claim 16, wherein one of the sample frames is conditioned on one of the conditional frames that occurs later in time than the one of the sample frames.

19. The method of claim 18, wherein the one of the sample frames is also conditioned on one of the conditional frames that occurs earlier in time than the one of the sample frames.

20. The method of claim 16, wherein at least some of conditional frames are used to condition the new sample frames for all of the stages.

21. The method of claim 15, wherein the at least one new sample data entry is of a different modality than the at least one data entry on which generation of the at least one new sample data entry is conditioned.

22. A system comprising:
at least one processor;
storage, communicatively coupled to the at least one processor; and
at least one non-transitory computer readable medium communicatively coupled to the at least one processor, the at least one non-transitory computer readable medium having stored thereon computer program code that, when executed, causes the at least one processor to perform a method comprising:
generating data using a probabilistic generative model, wherein the probabilistic generative model is trained using a plurality of different data generation tasks respectively corresponding to a plurality of vectors each comprising a sequence of differently indexed data entries that are conditionally dependent on each other, and wherein each of the data generation tasks comprises generating at least one latent data entry selected from the sequence of data entries in response to being provided at least one index for each of the at least one latent data entry; and
storing the data that is generated in the storage.

23. The method of claim 22, wherein for at least one of the data generation tasks:
the data generation task is a conditional data generation task and comprises providing to the probabilistic generative model at least one observed data entry and at least one corresponding index selected from the sequence of data entries, and wherein generating the at least one latent data entry is conditioned on the at least one observed data entry and the at least one corresponding index, and
at least one of the at least one latent data entry that is generated is non-consecutively indexed relative to each of the at least one observed data entry.

24. A non-transitory computer readable medium comprising computer program code that, when executed, causes at least one processor to perform a method comprising generating data using a probabilistic generative model, wherein the probabilistic generative model is trained using a plurality of different data generation tasks respectively corresponding to a plurality of vectors each comprising a sequence of differently indexed data entries that are conditionally dependent on each other, wherein each of the data generation tasks comprises generating at least one latent data entry selected from the sequence of data entries in response to being provided at least one index for each of the at least one latent data entry, and wherein during training each of the at least one latent data entry that is generated is evaluated against an actual value of the at least one latent data entry.

25. The non-transitory computer readable medium of claim 24, wherein for at least one of the data generation tasks:
the data generation task is a conditional data generation task and comprises providing to the probabilistic generative model at least one observed data entry and at least one corresponding index selected from the sequence of data entries, and wherein generating the at least one latent data entry is conditioned on the at least one observed data entry and the at least one corresponding index, and
at least one of the at least one latent data entry that is generated is non-consecutively indexed relative to each of the at least one observed data entry.

26. A method comprising:
performing, over multiple stages:
inputting to a probabilistic generative model at least one index respectively corresponding to at least one latent data entry to be generated;
generating, using the probabilistic generative model, the at least one latent data entry based on the at least one index corresponding to the at least one latent data entry, wherein the at least one latent data entry is selected from a sequence of differently indexed data entries that are conditionally dependent on each other; and
determining a denoising loss based on the at least one latent data entry; and
training the probabilistic generative model based on reducing an overall denoising loss over at least some of the multiple stages, wherein the multiple stages correspond to different data generation tasks.

27. The method of claim 26, wherein the training comprises minimizing an expected value of the overall denoising loss over all of the stages.

28. The method of claim 27, wherein the score based diffusion model comprises a denoising diffusion probabilistic model (DDPM).

29. The method of claim 26, wherein the probabilistic generative model comprises a score based diffusion model.

30. The method of claim 26, wherein the probabilistic generative model comprises at least one attention layer, wherein each of the at least one attention layer relates different ones of the differently indexed data entries according to indices or modalities of the differently indexed data entries.

31. The method of claim 26, wherein relative position encodings are used to relate different ones of the differently indexed data entries to each other by respective indices of the differently indexed data entries.

32. The method of claim 26, wherein at least one of the data generation tasks is a conditional data generation task and comprises providing to the probabilistic generative model at least one observed data entry and at least one corresponding index selected from the sequence of data entries, and wherein generating the at least one latent data entry is conditioned on the at least one observed data entry and at least one corresponding index.

33. The method of claim 32, wherein for the at least one of the data generation tasks that is the conditional data generation task, at least one of the at least one latent data entry that is generated is non-consecutively indexed relative to each of the at least one observed data entry.

34. The method of claim 26, wherein for at least one of the different data generation tasks, the at least one latent data entry is unconditionally generated by requiring generating without inputting to the probabilistic generative model a particular one of the data entries on which to condition generation of the at least one latent data entry.

* * * * *